(12) United States Patent
Duke et al.

(10) Patent No.: US 11,037,188 B1
(45) Date of Patent: *Jun. 15, 2021

(54) OFFERS TO PRINT THREE-DIMENSIONAL OBJECTS

(71) Applicant: Wells Fargo Bank, N.A., San Francisco, CA (US)

(72) Inventors: Michael Thomas Duke, Monroe, NC (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,834

(22) Filed: Nov. 25, 2019

Related U.S. Application Data

(63) Continuation of application No. 15/246,042, filed on Aug. 24, 2016, now Pat. No. 10,489,816.

(51) Int. Cl.
*G06Q 30/02* (2012.01)
*G06Q 20/12* (2012.01)
(Continued)

(52) U.S. Cl.
CPC .......... *G06Q 30/0239* (2013.01); *B33Y 50/02* (2014.12); *G06Q 20/12* (2013.01); *G06Q 30/0635* (2013.01)

(58) Field of Classification Search
CPC ..................................................... G06Q 30/02
(Continued)

(56) References Cited

U.S. PATENT DOCUMENTS

| 8,562,324 B2 | 10/2013 | Pettis |
| 10,489,816 B1 | 11/2019 | Duke et al. |

(Continued)

FOREIGN PATENT DOCUMENTS

WO    WO 2016/118969 A1 *  7/2016  ............... B44C 1/22

OTHER PUBLICATIONS

Jiang Yue-Juan; Yang Ming; Lu Bing-Heng,Algorithm Research on the Cloud Data Process of 3D Printing Collecting-Distribution Manufacturing (English), 2016 6th International Conference on Digital Home (ICDH) (pp. 278-282), Dec. 1, 2016 (Year: 2016).*

(Continued)

*Primary Examiner* — Marilyn G Macasiano
(74) *Attorney, Agent, or Firm* — Shumaker & Sieffert, P.A.

(57) ABSTRACT

This disclosure describes techniques that include offering to generate, fabricate, or print an object that may be of interest to a user, customer, or consumer. In one example, a method includes collecting, by a computing system, information about a user; generating, by the computing system and based on the information about the user, an offer to print a three-dimensional object, wherein the offer includes a plurality of offer conditions and is generated without receiving from the user a specific request for the offer; outputting, by the computing system and for display, information sufficient to present the offer to the user through a user interface that identifies the plurality of offer conditions and a timeframe over which the challenge is to be completed; determining, by the computing system, that the plurality of offer conditions have been completed during the timeframe; and responsive to determining, enabling a three-dimensional printer to generate the three-dimensional object.

20 Claims, 14 Drawing Sheets

(51) Int. Cl.
*G06Q 30/06* (2012.01)
*B33Y 50/02* (2015.01)

(58) Field of Classification Search
USPC .......................................................... 705/310
See application file for complete search history.

(56) References Cited

U.S. PATENT DOCUMENTS

| | | | |
|---|---|---|---|
| 2009/0061093 A1* | 3/2009 | Paz-Pujalt | G06Q 30/02 |
| | | | 427/256 |
| 2009/0186635 A1* | 7/2009 | Vieri | G06Q 30/0251 |
| | | | 455/466 |
| 2012/0130846 A1 | 5/2012 | Alivandi | |
| 2012/0154434 A1* | 6/2012 | Costea | G06F 16/29 |
| | | | 345/629 |
| 2014/0019299 A1 | 1/2014 | Stewart | |
| 2015/0172773 A1 | 6/2015 | Klappert et al. | |
| 2015/0221053 A1* | 8/2015 | Tapley | G06F 3/1272 |
| | | | 705/310 |

OTHER PUBLICATIONS

Prosecution History from U.S. Appl. No. 15/246,042, dated Apr. 4, 2019 through Jul. 29, 2019, 438 pp.

* cited by examiner

OFFERS TO PRINT THREE-DIMENSIONAL OBJECTS

CROSS REFERENCE

This application is a continuation application of and claims priority to U.S. patent application Ser. No. 15/246,042 filed on Aug. 24, 2016, and which is hereby incorporated by reference herein in its entirety.

BACKGROUND

Offering promotional objects to consumers can be an effective way to build a brand, build loyalty, and increase consumer awareness. Yet, promotional items may be costly to produce and distribute, and demand for promotional items might not be easy to estimate. Inaccurate estimates may lead to either scarcity or waste. Similarly, a business that offers products for sale may often make investments in product inventory well in advance of sales, so inaccurate demand estimates may have a deleterious effect on business performance. Even for businesses that do not maintain a stock of product inventory, costs associated with product manufacturing and delivery are seemingly inevitable.

SUMMARY

In general, this disclosure is directed to techniques that include offering to generate, fabricate, or print an object that may be of interest to a user, customer, or consumer. In some examples, the object may be generated, fabricated, and/or printed by a three-dimensional printer that may be located in a private home. In other examples, the three-dimensional printer may be located in a place of business, retail store, bank, shop, restaurant or elsewhere. Offers to print an object may be delivered through a mobile computing device, and such offers may be made in one or more of a variety of forms. Such forms include, but are not limited to, an offer to sell an object, a notification of the availability of a free object, a challenge to complete tasks or attain milestones in exchange for the object, or a surprise offering. A mobile computing device may be used to control and/or manage the three-dimensional printing of the object.

An offered three-dimensional object may be relevant to a particular environment, surroundings, actions, and/or context, typically as related to a user of a mobile computing device. In some examples, information about the user's environment, surroundings, actions, context, and/or interests may be determined by a mobile computing device through sensors, hardware, input devices, or modules, some or all of which may be included within the mobile computing device. In some examples, such information may be used to personalize the three-dimensional object.

In one example, a method comprises collecting, by a computing system, information about a user; generating, by the computing system and based on the information about the user, an offer to print a three-dimensional object, wherein the offer includes a plurality of offer conditions and is generated without receiving from the user a specific request for the offer; outputting, by the computing system and for display, information sufficient to present the offer to the user through a user interface that identifies the plurality of offer conditions and a timeframe over which the challenge is to be completed; determining, by the computing system, that the plurality of offer conditions have been completed during the timeframe; and responsive to determining, enabling a three-dimensional printer to generate the three-dimensional object.

In another example, a system a storage system; and processing circuitry having access to the storage system and configured to: collect information about a user, generate, based on the information about the user, an offer to print a three-dimensional object, wherein the offer includes a milestone task to be performed prior to a completion task, output, for display, information sufficient to present the offer to the user through a user interface that identifies the milestone task, the completion task, and a timeframe over which the challenge is to be completed, determine that the milestone task and the completion task have been completed during the timeframe, and responsive to determining, enabling a three-dimensional printer to generate the three-dimensional object.

In another example, a computer-readable storage medium comprises instructions that, when executed, cause at least one processor of a mobile device to: collect information about a user; generate, based on the information about the user, an offer to print a three-dimensional object, wherein the offer includes a milestone task to be performed prior to a completion task, output, for display, information sufficient to present the offer to the user through a user interface that identifies the milestone task, the completion task, and a timeframe over which the challenge is to be completed; and determine that the milestone task and the completion task have been completed during the timeframe; and responsive to determining, enabling a three-dimensional printer to generate the three-dimensional object.

DETAILED DESCRIPTION

Figure 1:
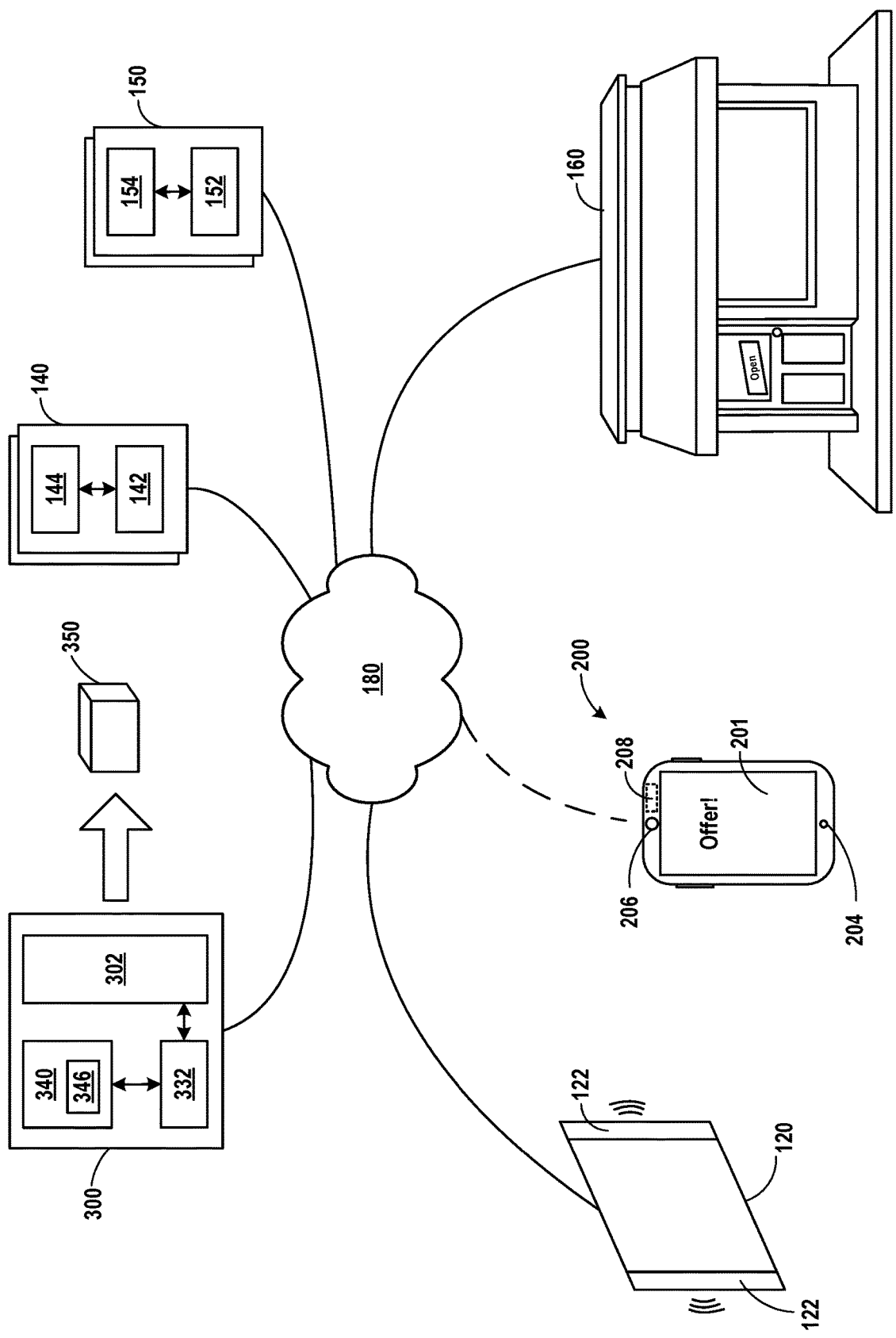
FIG. 1 is a conceptual diagram illustrating an example system in which offers to print one or more three-dimensional objects are made based at least in part on contextual information in accordance with one or more aspects of the present disclosure.

FIG. 1 is a conceptual diagram illustrating an example system in which offers to print one or more three-dimensional objects are made based at least in part on contextual information in accordance with one or more aspects of the present disclosure. Mobile device 200 may be a mobile device, such as a smart phone, a tablet computer, a laptop computer, a computerized watch, or any other type of wearable or non-wearable, mobile, or non-mobile computing devices that may be capable of operating in the manner described herein.

Shown in FIG. 1 is mobile device 200, video display 120, commercial building 160, three-dimensional printer 300, cloud server 140, and offer server 150. Some or all of mobile device 200, video display 120, commercial building 160, three-dimensional printer 300, cloud server 140, and offer server 150 may communicate over network 180 through wired or wireless connections or both. For example, in the example of FIG. 1, mobile device 200 is connected to network 180 through a wireless network (dotted line), and video display 120, commercial building 160, three-dimensional printer 300, cloud server 140, and offer server 150 are connected to network 180 through a wired network (solid line). Other configurations may be used in other examples.

Mobile device 200 includes presence-sensitive panel 201, audio sensor 204, camera 206, and geolocation module 208. Presence-sensitive panel 201 of mobile device 200 may function as respective input and/or output devices for mobile device 200. Presence-sensitive panel 201 may be implemented using various technologies. For instance, presence-sensitive panel 201 may function as one or more input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. Presence-sensitive panel 201 may detect input (e.g., touch and non-touch input) from a user of mobile device 200, which may include detecting one or more gestures from a user (e.g., the user touching, pointing, and/or swiping at or near one or more locations of presence-sensitive panel 201 with a finger or a stylus pen).

Figure 4:
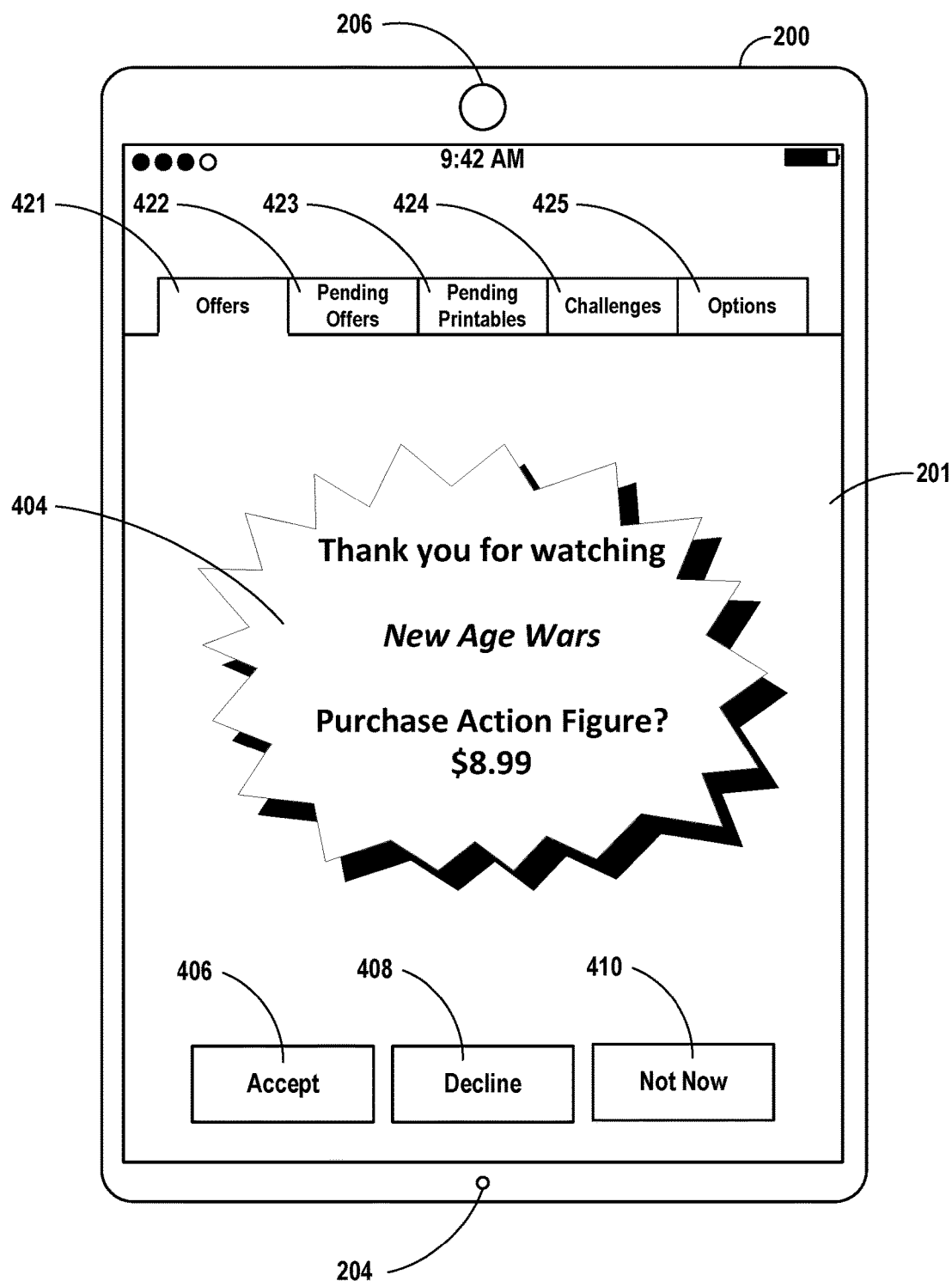
FIG. 4 is a conceptual diagram illustrating a graphical user interface of an example mobile device that may present an example purchase notification in accordance with one or more aspects of the present disclosure.

Presence-sensitive panel 201 may also function as one or more output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of mobile device 200. Presence-sensitive panel 201 may output information to a user in the form of a user interface (e.g., FIG. 4), which may be associated with functionality provided by mobile device 200. Such user interfaces may be associated with computing platforms, operating systems, applications, and/or services executing at or accessible from mobile device 200 (e.g., banking applications, electronic message applications, chat applications, Internet browser applications, mobile or desktop operating systems, social media applications, electronic games, and other types of applications). For example, presence-sensitive panel 201 may present one or more user interfaces which, as shown in FIG. 4, for example, are graphical user interfaces of an application executing at mobile device 200 and includes various graphical elements displayed at various locations of presence-sensitive panel 201.

Audio sensor 204 may be one or more audio detection devices, such as a microphone. Audio sensor 204 may be capable of detecting audio sounds near mobile device 200, such as audio from a nearby radio, television, video display 120, or audio from other sources within the environment near mobile device 200, such as nearby people, pets, vehicles, commercial building 160, to name just a few examples. Audio sensor 204 may include audio or signal processing hardware. Audio sensor 204 may output indications of audio input reflecting input detected by audio sensor 204.

Camera 206 may be one or more of any appropriate type of image acquisition devices, such as a camera or charge-coupled device. In other examples, camera 206 may be or may further include one or more other types of cameras or image sensors, which may include one or more other infrared cameras, thermographic cameras, thermal imaging cameras, light-sensitive cameras, range sensors, tomography devices, radar devices, or ultrasonic cameras. In some examples, camera 206 may be any image capture device appropriate for application of computer vision techniques.

Geolocation module 208 may be hardware, software, or a combination of both hardware or software. For instance, geolocation module 208 may include one or more location sensors capable of determining information about the location of mobile device 200. Geolocation module 208 may include one or more GPS chips that uses satellite data to calculate a global position. In other examples, geolocation module 208 may alternatively, or in addition, use information from cell towers, Wi-Fi networks, or other network information to triangulate location information or approximate location information. Geolocation module 208 may output location information or indications of location information reflecting one or more locations at which mobile device 200 may be positioned or located.

Three-dimensional printer 300 is a device or system that can create a solid three-dimensional object out of a variety of materials, based on a digital description of the object. Typically, a three-dimensional (3D) printer, such as three-dimensional printer 300, performs additive manufacturing by obtaining a 3D model of the object, translating it into a series of thin layers, and then building the object one layer at a time, stacking up material until the object is completed. This is an example technique, however, other techniques may be used.

Three-dimensional printer 300 includes processor 332, storage device 340, and three-dimensional object generation module 302. Three-dimensional printer 300 may perform three-dimensional printing, generation, manufacturing, and/or fabrication operations using software, hardware, firmware, or a mixture of hardware, software, and firmware. One or more processors 332 may execute instructions that are stored in storage device 340 to control three-dimensional object generation module 302, and cause three-dimensional object generation module 302 to generate three-dimensional object 350. Such instructions may include or be derived from blueprint 346, which may be stored within storage device 340. In general, blueprint 346 may include a description of three-dimensional object 350 sufficient to derive instructions to generate, print, fabricate, or otherwise produce three-dimensional object 350. Blueprint 346 may be generated from software such as a computer aided design (CAD) program, or another 3D modeling program. Blueprint 346 may also be generated with a 3D scanner from an existing three-dimensional object. In some examples, three-dimensional printer 300 may create one or more objects (or "printed 3D objects") from blueprint 346.

In some examples, three-dimensional printer 300 may be located at the home of the user of mobile device 200, and may be owned, rented, or leased by the user. In some cases, mobile device 200 may be located remotely from three-dimensional printer 300, such as for example, when the user is not at home and has mobile device 200 in his or her possession. Three-dimensional printer 300 may be shared by one or more occupants of the user's home, or may be shared by one or more other individuals. In other examples, three-dimensional printer 300 may be located elsewhere, such as at commercial building 160 or at another public or private location. In other examples, more than one three-dimensional printer 300 may be available.

Video display 120 may be a television screen in a private home or other location. Video display 120 may also be a large screen in a movie theatre or cinema, or in any other location. Other examples are possible. Audio device 122 may generate audio sounds associated with the video being shown on video display 120. The audio sounds may be capable of being detected by audio sensor 204 of mobile device 200.

Commercial building 160 may include a storefront, building, office, or other structure associated with a traditional retailer, or a bank, mall, shop, restaurant, service center, or other commercial or non-commercial location. Commercial building 160 may house one or more computing devices, networks, video screens or displays, and/or one more three-dimensional printers 300.

FIG. 1 includes one or more cloud servers 140. Each cloud server 140 may include one or more processors 142 and one or more storage devices 144, and each cloud server 140 may also include one or more input devices, one or more output devices, and one or more other components, peripherals, and auxiliary devices. Each cloud server 140 may perform operations described herein in accordance with one or more aspects of the present disclosure using software, hardware, firmware, or a mixture of hardware, software, and firmware residing in and/or executing at cloud server 140. For instance, in some examples, one or more processors 142 may execute instructions that are stored in storage devices 144 to perform operations described herein in accordance with one or more aspects of the present disclosure.

FIG. 1 includes one or more offer servers 150. Each offer server 150 may include one or more processors 152 and one or more storage devices 154, and each offer server 150 may also include one or more input devices, one or more output devices, and one or more other components, peripherals, and auxiliary devices. Each offer server 150 may perform operations described herein in accordance with one or more aspects of the present disclosure using software, hardware, firmware, or a mixture of hardware, software, and firmware residing in and/or executing at offer server 150. For instance, in some examples, one or more processors 152 may execute instructions that are stored in storage devices 154 to perform operations described herein in accordance with one or more aspects of the present disclosure.

In the example of FIG. 1, mobile device 200 may be a mobile phone or other mobile device carried by a user throughout the day. In such an example, mobile device 200 may be exposed to various information relating to its surroundings, context, and/or environment. For example, mobile device 200 may detect audio information, visual or image information, location information, or other information. Mobile device 200 may detect such information often, in some cases continuously or close to continuously, including when a user is not actively interacting with mobile device 200. Based on such information, and in some examples, mobile device 200 and/or another device may be able to determine an appropriate and/or attractive offer to print a three-dimensional object that may be of interest to the user of mobile device 200. Mobile device 200 may present the offer to the user automatically, as a push notification, for example. Thus, in some examples, mobile device 200 may present the offer without a specific request for it, and in some cases, the offer may be a surprise to the user. If mobile device 200 detects that the offer has been accepted, mobile device 200 may enable three-dimensional printer 300 to print the offered three-dimensional object 350, such as by mobile device 200 communicating with one or more devices over network 180. In some examples, three-dimensional printer 300 is located in the user's home, and the offered three-dimensional object 350 can be printed remotely, even when the user is not at home, so that three-dimensional object 350 may be generated or printed when the user returns home.

With reference to FIG. 1, in one particular example, mobile device 200 may detect geolocation information indicating that mobile device 200 is at or near commercial building 160. In response to such input, mobile device 200 may send over network 180 to offer server 150 an indication of input indicating that mobile device 200 is at or near commercial building 160. Offer server 150 may determine, based on the indication of input received from mobile device 200, one or more offers. For instance, if commercial building 160 is a bank, offer server 150 may determine that an offer for a keychain carrying the logo of the bank associated with commercial building 160 is appropriate, and may communicate information about the offer over network 180 to mobile device 200. Mobile device 200 may present the offer to the user, such as by displaying the offer on presence-sensitive panel 201. Other examples may include other ways to present the offer to the user, such as an audio or tactile notification. Mobile device 200 may detect input indicating that the offer has been accepted, and in response, mobile device 200 may send an indication of input accepting the offer over network 180 to offer server 150. In response to receiving the indication of input accepting the offer, offer server 150 may send over network 180 to three-dimensional printer 300 a blueprint or set of instructions describing the offered keychain or describing how to print the offered keychain. This information may be stored in storage device 340 as blueprint 346. Processor 332 within three-dimensional printer 300 may access blueprint 346 and control three-dimensional object generation module 302 to print the keychain offered by the bank.

In the example described, the keychain is not being mass-produced, and may be being produced on an as-needed basis for one user. The operation of printing the keychain itself may be consider a factor in determining whether a customer earns rewards or discounts. In one example, for instance, a customer that prints the keychain may receive, or receive an offer for, free checking for one year. Accordingly, the keychain may be personalized to include attributes that apply to that user, and in some cases, attributes that apply uniquely to that user. Further, the keychain may have some intelligent features, which could be tailored to the user of mobile device 200. For example, the keychain may be preloaded with rules, currency, or rewards benefits that may enable the purchase of other objects. The keychain could also be configured to communicate with certain other devices, and such communications may be permitted in a way personalized to the user. Since mobile device 200 may have access to the user's bank account, profile information, permissions, or other information, mobile device 200 may communicate such information to offer server 150 and/or to three-dimensional printer 300 in a way such that three-dimensional printer 300 enables intelligent features to be included in a keychain created by three-dimensional printer 300. For example, offer server 150 may include personalized information relevant to the user of mobile device 200 within blueprint 346. Alternatively, three-dimensional printer 300 might be configured to also have access to the user's bank account, profile information, permissions or other information, and three-dimensional printer 300 may be configured to apply such information so as to personalize objects that it prints for the user of mobile device 200 to incorporate intelligent features.

Again referring to FIG. 1, in another example, video display 120 may be presenting or showing an action adventure movie (with audio information generated by audio device 122). If mobile device 200 is nearby, mobile device 200 may detect audio input indicating that the action adventure movie is playing. In response to such input, mobile device 200 may send over network 180 to offer server 150 an indication of input that mobile device 200 has detected audio input associated with the action adventure movie. Offer server 150 may determine, based on the indication of input received from mobile device 200, one or more offers. For instance, for this particular movie, offer server 150 may determine that an offer for an action figure depicted in the movie is an appropriate offer, and may communicate information about the offer over network 180 to mobile device 200. Mobile device 200 may present the offer to the user, such as by displaying the offer on presence-sensitive panel 201. Mobile device 200 may detect input indicating that the offer has been accepted, and in response, mobile device 200 may send an indication of input accepting the offer to offer server 150. In response to receiving the indication of input accepting the offer, offer server 150 may send over network 180 to three-dimensional printer 300 a blueprint or set of instructions describing the offered action figure, or describing how to print the offered action figure. Again, this information may be stored in storage device 340 as blueprint 346. Processor 332 within three-dimensional printer 300 may access blueprint 346 and control three-dimensional object generation module 302 to print the offered action figure.

Still referring to FIG. 1, and in yet another example, mobile device 200 may detect information from one or more other devices, and use such information to gain insight into what a user of mobile device 200 is likely doing, watching, or experiencing. For instance, mobile device 200 may perform a transaction or other interaction at cloud server 140. For example, mobile device 200 may, at the direction of a user, order take-out food at a restaurant. Mobile device 200 may detect that such an order was placed, and mobile device 200 may communicate information about the transaction over network 180 to offer server 150. Offer server 150 may determine, based on the information about the transaction received from mobile device 200, one or more offers. For instance, by ordering take-out food, offer server 150 may determine that an offer for a token used for future discounts at the same restaurant may be an appropriate offer. In such an example, offer server 150 may communicate information about the offer over network 180 to mobile device 200. Mobile device 200 may present the offer to the user, such as by displaying the offer on presence-sensitive panel 201. Mobile device 200 may detect input indicating that the offer has been accepted, and in response, mobile device 200 may send an indication of input accepting the offer to offer server 150. In response to receiving the indication of input accepting the offer, offer server 150 may send over network 180 to three-dimensional printer 300 a blueprint or set of instructions describing the offered token or describing how to print the offered token. This information may be stored in storage device 340 as blueprint 346, and processor 332 within three-dimensional printer 300 may access blueprint 346 and control three-dimensional object generation module 302 to print the offered token. In some examples, the token may be used for a limited-time discount (e.g., 20% off dine-in orders for the month of December by showing the token), or for another promotion (e.g., free side order by showing the token), or to trigger a donation to charity (e.g., the restaurant donates to charity each time the token is shown or used).

In at least some of the examples described above in connection with FIG. 1, offer server 150 determines offers in response to information received from mobile device 200. In other examples, logic for determining offers may be distributed over more than one device or computer system, so that offer server 150 in combination with one or more other devices or computer systems may determine offers based on information detected by mobile device 200 or elsewhere. In some examples, offer server 150 in combination with mobile device 200 may determine offers in an example where logic for determining offers is distributed over multiple devices including mobile device 200.

In other examples, mobile device 200 may alone determine offers in response to input detected by mobile device 200 or other information available to mobile device 200. Alternatively, mobile device 200 may alone determine offers in response to input detected by mobile device 200 and other information mobile device 200 accesses at other devices on network 180, such as one or more cloud servers 140 or one or more offer servers 150.

In the examples described above, mobile device 200 detects geolocation information indicating mobile device 200 is located at a bank, mobile device 200 detects audio information suggesting a user of mobile device 200 is watching an action adventure movie, and mobile device 200 detects information about a take-out food order. In other examples, mobile device 200 may detect many other types of information that may be used to determine an appropriate offer. For example, geolocation information may be used to determine that mobile device 200 is located within or near a retail store, restaurant, cinema, bank, amusement park, gas station, or other location.

In another example, mobile device 200 may be able to detect audio information that suggests that a user of mobile device 200 is listening to the radio, speaking to a colleague or friend, or watching a particular video or television show. Audio information may also be used to determine that a user of mobile device 200 is visiting a particular restaurant, retail establishment, or the like if sufficiently identifiable audio information is detected at such a location.

Mobile device 200 may also detect image information that can be used to determine what a user of mobile device 200 may be seeing. For example, mobile device 200 may be able to determine that a user of mobile device 200 is likely experiencing a sunny day, or is in a dimly-lit or brightly-lit room. Mobile device 200 may also be able to detect images that it can determine are associated with a particular person. Based on this information, mobile device 200 may be able to determine that a user of mobile device 200 is speaking with a friend. In another example, mobile device 200 may be able to detect images that it can determine are associated with a particular location, retail establishment or even location within a particular retail establishment (e.g., within a men's clothing section of a department store, or within a women's shoe section of a department store). Based on this information, mobile device 200 may be able to determine that a user of mobile device 200 is shopping for shoes at a particular store.

In other examples, mobile device 200 may detect that it is near another mobile phone associated with identification information (e.g., a phone number) that corresponds to contact information stored in mobile device 200. Mobile device 200 may conclude, based on this information, that it is near that contact.

In another example, mobile device 200 may receive information from a server for a bank indicating that a transaction for a given item was just processed. Mobile device 200 may determine, based on this information, that user mobile device 200 just purchased the identified item. In general, mobile device 200 may receive transaction information from a number of sources, including retailers, for example, indicating that a user purchased one or more specific items. From this information, mobile device 200 may infer interest in products and/or services in related areas.

In accordance with one or more aspects of the present disclosure, notifications or offers for three-dimensional objects can be presented at appropriate times, and in relevant situations, based on knowledge of a user's environment, context, and interests. Such offers may benefit consumers, particularly where they involve useful three-dimensional objects tailored to the interests of each consumer. Such offers may benefit organizations, retailers, and other commercial enterprises, because they engender effective loyalty campaigns, and enable targeted and effective commercial communication with customers and potential customers.

Further, in some examples, objects are created only when needed, so waste associated with excess inventory may be avoided. Still further, since objects may be generated or printed by three-dimensional printer 300 one at a time and for one specific person, such objects may be personalized to that person and in some cases, may be unique to that person.

In some examples, three-dimensional printer 300 may be conveniently located within a user's home, and offered three-dimensional objects can be printed remotely when the user is away from home. Further, since the object is created at the user's home, it may be possible to avoid consuming energy, time, and resources that may otherwise be required to create the object at another location and then deliver to the object to user's home by boat, truck, plane, train, or automobile.

In accordance with one or more aspects of this disclosure, one or more computing devices may analyze information associated with a user of the same or another computing device. It may be appropriate for such a computing device to analyze such information only after receiving permission from the user. For example, in some examples described in this specification, before a computing device can collect or make use of information associated with a user, the user may be provided with an opportunity to control whether the computing device can collect or make use of information about the user (e.g., information about the input detected by a computing device, such as audio, images, or geolocation information detected by the computing device), or to dictate whether and/or how the computing device can use such information. In some examples, certain data may be modified so that personally-identifiable information is removed. In other examples, a user's geographic location may be generalized where location information is obtained (such as to a city, ZIP code, or state level), so that a particular location of a user cannot be determined.

Figure 2:
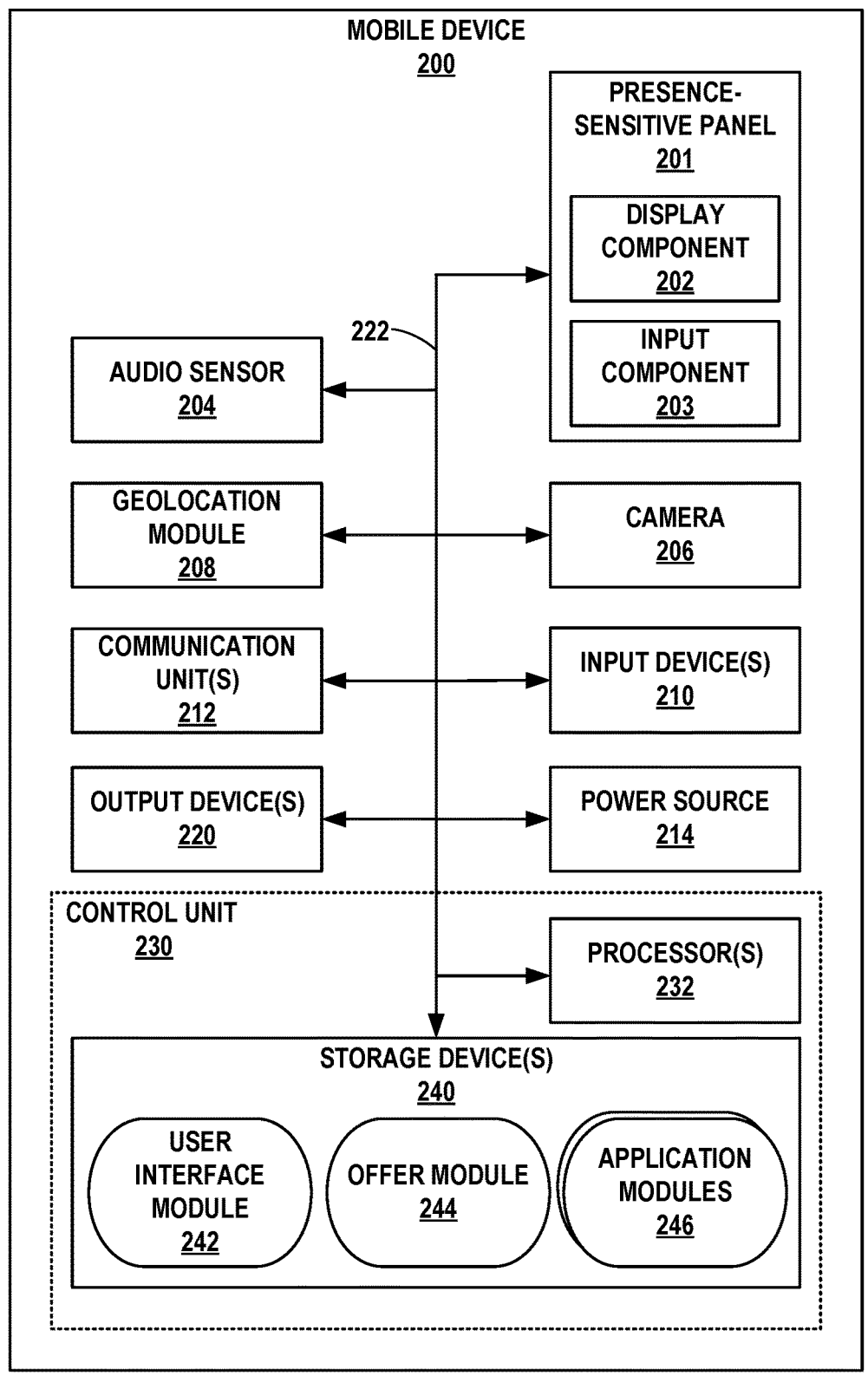
FIG. 2 is a block diagram illustrating an example mobile device that is configured to detect contextual information and present one or more offers to print a three-dimensional object in accordance with one or more aspects of the present disclosure.

FIG. 2 is a block diagram illustrating an example mobile device 200 that is configured to detect contextual information and present one or more offers to print a three-dimensional object in accordance with one or more aspects of the present disclosure. Mobile device 200 is described below in the context of FIG. 1 and as an example of mobile device 200 of FIG. 1. FIG. 2 illustrates only one particular example of mobile device 200, and other examples of mobile device 200 may be used in other instances and may include a subset of the components included in FIG. 2 or may include additional components not shown in FIG. 2.

As shown in FIG. 2, mobile device 200 includes presence-sensitive panel 201, audio sensor 204, camera 206, geolocation module 208, one or more input devices 210, one or more communication units 212, power source 214, one or more output devices 220, and control unit 230. Control unit 230 includes one or more processors 232 and one or more storage devices 240. Storage devices 240 include UI module 242, offer module 244, and application module 246. Communication channels 222 may interconnect one or more of the components described herein or shown in FIG. 2 for inter-component communications (physically, communicatively, and/or operatively). In some examples, communication channels 222 may include a system bus, a network connection, one or more inter-process communication data structures, or any other components for communicating data between hardware and/or software.

Presence-sensitive panel 201, audio sensor 204, camera 206, and geolocation module 208 may receive input, as previously described. Presence-sensitive panel 201 may include both display component 202 and input component 203. Display component 202 may be a screen at which information is displayed by presence-sensitive panel 201. In some examples, display component 202 may be an output device such as cathode ray tube (CRT) monitor, liquid crystal display (LCD), Light-Emitting Diode (LED) or any other type of device for generating tactile, audio, and/or visual output.

Input component 203 may detect an object at and/or near display component 202. As one example range, input component 203 may detect an object, such as a finger or stylus that is within two inches or less of display component 202. Input component 203 may determine a location (e.g., an {x, y} coordinate) of display component 202 at which the object was detected. In another example range, input component 203 may detect an object six inches or less from display component 202 and other ranges are also possible. Input component 203 may determine the location of display component 202 selected by a user's finger using capacitive, inductive, and/or optical recognition techniques. In some examples, input component 203 also provides output to a user using tactile, audio, or video stimuli as described with respect to display component 202. In the example of FIG. 2, presence-sensitive panel 201 may present a user interface.

While illustrated as an internal component of mobile device 200, presence-sensitive panel 201 may also represent an external component that shares a data path with mobile device 200 for transmitting and/or receiving input and output. For instance, in one example, presence-sensitive panel 201 represents a built-in component of mobile device 200 located within and physically connected to the external packaging of mobile device 200 (e.g., a screen on a mobile phone). In another example, presence-sensitive panel 201 represents an external component of mobile device 200 located outside and physically separated from the packaging or housing of mobile device 200 (e.g., a monitor, a projector, etc. that shares a wired and/or wireless data path with mobile device 200).

Presence-sensitive panel 201 of mobile device 200 may detect two-dimensional and/or three-dimensional gestures as input from a user of mobile device 200. For instance, a sensor of presence-sensitive panel 201 may detect a user's movement (e.g., moving a hand, an arm, a pen, a stylus, etc.) within a threshold distance of the sensor of presence-sensitive panel 201. Presence-sensitive panel 201 may determine a two or three dimensional vector representation of the movement and correlate the vector representation to a gesture input (e.g., a hand-wave, a pinch, a clap, a pen stroke, etc.) that has multiple dimensions. In other words, presence-sensitive panel 201 can detect a multi-dimension gesture without requiring the user to gesture at or near a screen or surface at which presence-sensitive panel 201 outputs information for display. Instead, presence-sensitive panel 201 can detect a multi-dimensional gesture performed at or near a sensor which might or might not be located near the screen or surface at which presence-sensitive panel 201 outputs information for display.

FIG. 2 also includes input devices 210. Input devices 210 may receive input, such as from a mouse or equivalent device, keyboard, voice responsive system, video camera, buttons, control pad, microphone or any other type of device for detecting input from a human or machine.

Input devices 210 may also include one or more sensors, which may include may include an accelerometer that generates accelerometer data. Accelerometer data may indicate an acceleration and/or a change in acceleration of mobile device 200. Input devices 210 may include a gyrometer that generates gyrometer data. Gyrometer data may indicate a physical orientation and/or change in physical orientation of mobile device 200. In some examples, the orientation may be relative to one or more reference points. Input devices 210 may include a magnetometer that generates magnetometer data. Magnetometer data may indicate the magnetization of an object that is touching or in proximity to mobile device 200. Magnetometer data may indicate the Earth's magnetic field, and in some examples, provide directional functionality of a compass. Input devices 210 may include an ambient light sensor that generates ambient light data. The ambient light data may indicate an intensity of light to which mobile device 200 is exposed. Input devices 210 may include a proximity sensor that generates proximity data. Proximity data may indicate whether an object is within proximity to mobile device 200. In some examples, proximity data may indicate how close an object is to mobile device 200. In some examples, input devices 210 may include a clock that generates a date and time. The date and time may be a current date and time. Input devices 210 may include temperature sensor that measures ambient temperature in proximity to mobile device 200. The ambient temperature may indicate an intensity of temperature.

One or more output devices 220 may generate, receive, or process output. Examples of output are tactile, audio, and video output. Output devices 220 of mobile device 200, in one example, may include a presence-sensitive screen, sound card, video graphics adapter card, speaker, cathode ray tube (CRT) monitor, liquid crystal display (LCD), or any other type of device for generating output to a human or machine. Output devices 220 may include display devices such as cathode ray tube (CRT) monitor, liquid crystal display (LCD), Light-Emitting Diode (LED) or any other type of device for generating tactile, audio, and/or visual output.

One or more communication units 212 may communicate with external devices by transmitting and/or receiving data. For example, mobile device 200 may use communication units 212 to transmit and/or receive radio signals on a radio network such as a cellular radio network. In some examples, communication units 212 may transmit and/or receive satellite signals on a satellite network such as a Global Positioning System (GPS) network. Examples of communication units 212 include a network interface card (e.g. such as an Ethernet card), an optical transceiver, a radio frequency transceiver, a GPS receiver, or any other type of device that can send and/or receive information. Other examples of communication units 212 may include Bluetooth®, GPS, 3G, 4G, and Wi-Fi® radios found in mobile devices as well as Universal Serial Bus (USB) controllers and the like.

Mobile device 200 may include power source 214. In some examples, power source 214 may be a battery. Power source 214 may provide power to one or more components of mobile device 200. Examples of power source 214 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 214 may have a limited capacity (e.g., 1000-3000 mAh).

Control unit 230 may store and execute the data and instructions of one or more applications, modules or other software. Although FIG. 2 illustrates control unit 230 as including one or more processors 232 and one or more storage devices 240, control unit 230 may include more or fewer components than shown in FIG. 2. For instance, control unit 230 may include one or more output devices, input devices, input/output ports or interface, sensors and/or communication units to name only a few examples. In other examples, control unit 230 may only include one processor. In most cases, control unit 230 may provide an operating environment for one or one more modules, such as UI module 242, offer module 244, and application modules 246.

One or more processors 232 may implement functionality and/or execute instructions within mobile device 200. For example, processors 232 of mobile device 200 may receive and execute instructions stored by storage device 240 that provide the functionality of UI module 242, offer module 244, and application modules 246. These instructions executed by processors 232 may cause mobile device 200 to store and/or modify information within storage device 240 during program execution. Processors 232 may execute instructions of UI module 242, offer module 244, and application modules 246. That is, UI module 242, offer module 244, and application modules 246 may be operable by processors 232 to perform various functions described herein.

UI module 242 manages user interactions with presence-sensitive panel 201 and other components of mobile device 200. In other words, UI module 242 may act as an intermediary between various components of mobile device 200 to make determinations based on user input detected by presence-sensitive panel 201 and generate output at presence-sensitive panel 201 in response to the user input. UI module 242 may receive instructions from an application, service, platform, or other module of mobile device 200 to cause presence-sensitive panel 201 to output a user interface (e.g., as shown in FIG. 4). UI module 242 may manage inputs received by mobile device 200 as a user views and interacts with the user interface presented at presence-sensitive panel 201 and update the user interface in response to receiving additional instructions from the application, service, platform, or other module of mobile device 200 that is processing the user input.

In some examples, offer module 244 may be a stand-alone application, service, or module executing at mobile device 200 and in other examples, offer module 244 may be a sub-component of an operating system controlling operation of mobile device 200. For example, offer module 244 may be integrated into a mobile banking application or third-party application executing at mobile device 200 (e.g., a coffee shop application or a video streaming application). In other examples, offer module 244 may be a stand-alone application or subroutine that is invoked by an application or operating platform of offer module 244 any time an application or operating platform detects contextual conditions appropriate for generating an offer, notification, or challenge for printing a three-dimensional object. In some examples, mobile device 200 may download and install offer module 244 from an application repository of a service provider (e.g., via the Internet). In other examples, offer module 244 may be preloaded as part of the operating system of mobile device 200.

Application modules 246 may represent some or all the various individual applications and services executing at and accessible from mobile device 200. A user of mobile device 200 may interact with a graphical user interface associated with one or more application modules 246 to cause mobile device 200 to perform a function. Numerous examples of application modules 246 may exist and include, a banking application, a retailer application, a video streaming application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at mobile device 200.

One or more storage devices 240 within mobile device 200 may store information for processing during operation of mobile device 200. In some examples, one or more storage devices 240 are temporary memories, meaning that a primary purpose of the one or more storage devices is not long-term storage. Storage devices 240 on mobile device 200 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 240, in some examples, also include one or more computer-readable storage media. Storage devices 240 may be configured to store larger amounts of information than volatile memory. Storage devices 240 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 240 may store program instructions and/or data associated with UI module 242, offer module 244, and/or application modules 246.

In operation, and with reference to both FIG. 1 and FIG. 2, audio sensor 204 may detect input in the form of one or more sounds, and in response, audio sensor 204 may output to UI module 242 an indication of input detected by audio sensor 204. Alternatively, or in addition, camera 206 may detect input in the form of one or more images, and in response, camera 206 may output to UI module 242 an indication of input detected by camera 206. Alternatively, or in addition, geolocation module 208 may detect input in the form of location information, and in response, geolocation module 208 may output to UI module 242 an indication of input detected by geolocation module 208. Also, alternatively or in addition, presence-sensitive panel 201 or input devices 210 may detect other input, and in response, presence-sensitive panel 201 or one or more input devices 210 may output to UI module 242 an indication of input detected by presence-sensitive panel 201 or one or more input devices 210. In some examples, UI module 242 may determine, based on the one or more indications of input received, information about the input. UI module 242 may output to offer module 244 information about the input. In response to the information about the input, offer module 244 may determine, based on the information about the input, an offer for a three-dimensional object. In some examples, offer module 244 determining an offer for a three-dimensional object may include offer module 244 sending information over network 180 using one or more communication units 212. Such information may be sent over network 180 to offer server 150 as described in connection with FIG. 1. Responsive to determining the offer, offer module 244 may cause UI module 242 to present an offer or notification at display component 202, presence-sensitive panel 201, or output devices 220.

Figure 3:
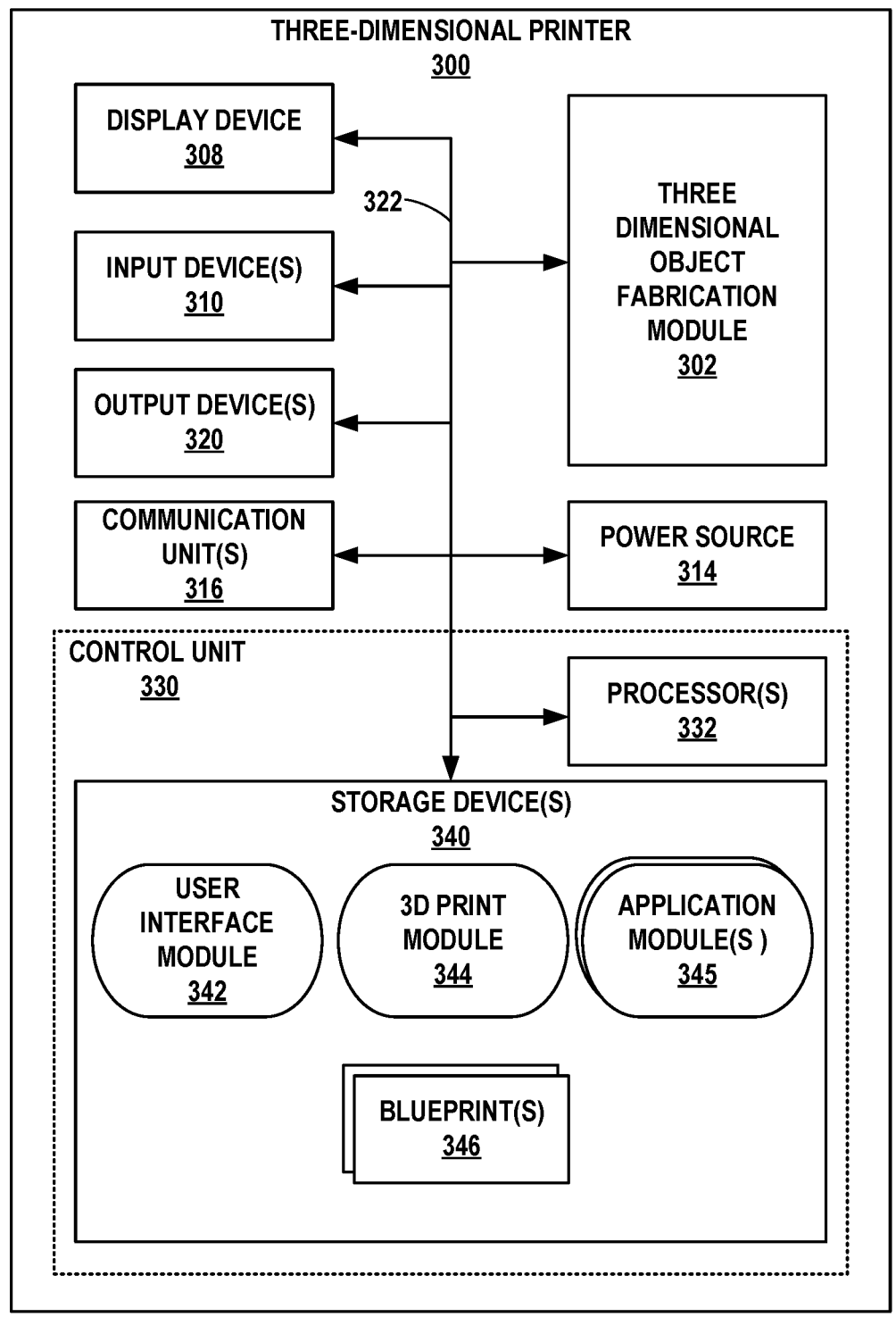
FIG. 3 is a block diagram illustrating an example three-dimensional printer that is configured to print or generate three-dimensional objects in accordance with one or more aspects of the present disclosure.

FIG. 3 is a block diagram illustrating an example three-dimensional printer 300 that is configured to print or generate three-dimensional objects in accordance with one or more aspects of the present disclosure. Three-dimensional printer 300 is described below in the context of FIG. 1 and as an example of three-dimensional printer 300 of FIG. 1. FIG. 3 illustrates only one particular example of three-dimensional printer 300, and other examples of three-dimensional printer 300 may be used in other instances and may include a subset of the components included in FIG. 3 or may include additional components not shown in FIG. 3.

As illustrated in FIG. 3, three-dimensional printer 300 includes three-dimensional object generation module 302, display device 308, one or more input devices 310, one or more output devices 320, power source 314, one or more communication units 316, and control unit 330. Control unit 330 includes one or more processors 332 and one or more storage devices 340. Storage devices 340 include UI module 342, three-dimensional print module 344, application modules 345, and blueprints 346. Communication channels 322 may interconnect one or more of the components described herein or shown in FIG. 3 for inter-component communications (physically, communicatively, and/or operatively). In some examples, communication channels 322 may include a system bus, a network connection, one or more inter-process communication data structures, or any other components for communicating data between hardware and/or software.

In some examples, display device 308 may be an output device such as cathode ray tube (CRT) monitor, liquid crystal display (LCD), Light-Emitting Diode (LED) or any other type of device for generating tactile, audio, and/or visual output.

Input devices 310 may receive input from various sources, including from a mouse or equivalent device, keyboard, voice responsive system, video camera, buttons, control pad, microphone or any other type of device for detecting input from a human or machine. Input devices 310 may also include one or more sensors, including any of the sensors described in connection with FIG. 2.

One or more output devices 320 may generate, receive, or process output. Examples of output are tactile, audio, and video output. Output devices 320 of three-dimensional printer 300, in one example, may include a presence-sensitive screen, sound card, video graphics adapter card, speaker, cathode ray tube (CRT) monitor, liquid crystal display (LCD), or any other type of device for generating output to a human or machine. Output devices 320 may include display devices such as cathode ray tube (CRT) monitor, liquid crystal display (LCD), Light-Emitting Diode (LED) or any other type of device for generating tactile, audio, and/or visual output. Three-dimensional object generation module 302 may be an output device.

One or more communication units 316 may communicate with external devices by transmitting and/or receiving data. For example, three-dimensional printer 300 may use communication units 316 to transmit and/or receive radio signals on a radio network such as a cellular radio network. In some examples, communication units 316 may transmit and/or receive satellite signals on a satellite network such as a Global Positioning System (GPS) network. Examples of communication units 316 include a network interface card (e.g. such as an Ethernet card), an optical transceiver, a radio frequency transceiver, a GPS receiver, or any other type of device that can send and/or receive information. Other examples of communication units 316 may include Bluetooth®, GPS, 3G, 4G, and Wi-Fi® radios found in mobile devices as well as Universal Serial Bus (USB) controllers and the like.

As shown in FIG. 3, three-dimensional printer 300 may include power source 314. In some examples, power source 314 may be a battery. Power source 314 may provide power to one or more components of three-dimensional printer 300.

As shown in FIG. 3, control unit 330 may store and execute the data and instructions of one or more applications, modules or other software. In most cases, control unit 330 may provide an operating environment for one or one more modules, such as UI module 342, three-dimensional print module 344, and application modules 345. FIG. 3 illustrates control unit 330 as including one or more processors 332 and one or more storage devices 340, but control unit 330 may include more or fewer components than shown in FIG. 3. For instance, control unit 330 may include one or more output devices, input devices, input/output ports or interface, sensors and/or communication units to name only a few examples. In other examples, control unit 330 may only include one processor.

One or more processor 332 may implement functionality and/or execute instructions within three-dimensional printer 300. For example, processors 332 of three-dimensional printer 300 may receive and execute instructions stored by storage device 340 that provide the functionality of UI module 342, three-dimensional print module 344, and application modules 345. These instructions executed by one or more processors 332 may cause three-dimensional printer 300 to store and/or modify information within storage device 340 during program execution. Processors 332 may execute instructions of UI module 342, three-dimensional print module 344, and application modules 345, thereby making UI module 342, three-dimensional print module 344, and application modules 345 be operable by processors 332 to perform various functions described herein.

UI module 342 manages user interactions with display device 308, input devices 310, and other components of three-dimensional printer 300. UI module 342 may act as an intermediary between various components of three-dimensional printer 300 to make determinations based on user input detected by input devices 310 and generate output at display device 308 in response to the user input. UI module 342 may receive instructions from an application, service, platform, or other module of three-dimensional printer 300 to cause display device 308 to output a user interface. UI module 342 may manage inputs received by three-dimensional printer 300 as a user views and interacts with a user interface presented at display device 308 and update the user interface in response to receiving additional instructions from the application, service, platform, or other module of three-dimensional printer 300 that is processing the user input.

Application modules 345 may represent various individual applications and services executing at and accessible from three-dimensional printer 300. In some examples, three-dimensional printer 300 may operate as a general purpose computer, having three-dimensional object generation module 302. In such an example three-dimensional printer 300 may also perform other tasks, under the control of one or more application modules 345. A user of three-dimensional printer 300 may interact with a graphical user interface associated with one or more application modules 345 to cause three-dimensional printer 300 to perform functions, including those that might not be directly related to printing 3D objects.

Blueprints 346 may include descriptions, specifications, instructions, or other details of one or more three-dimensional objects. In general, blueprints 346 are sufficient to derive instructions to generate, print, fabricate, or otherwise produce a three-dimensional object. Blueprint 346 may be generated from software such as a computer aided design (CAD) program, or another 3D modeling program. Blueprint 346 may also be generated with a 3D scanner from an existing three-dimensional object. In some cases, one or more blueprints 346 are received from a remote location, such as cloud server 140 or offer server 150 over network 180. In some examples, three-dimensional printer 300 may create one or more objects (or "printed 3D objects") from blueprint 346.

Three-dimensional print module 344 may control or interact with three-dimensional object generation module 302 to generate, print, and/or fabricate three-dimensional objects. Three-dimensional print module 344 may access one or more blueprints 346 and derive instructions for printing one or more three-dimensional objects specified by one or more blueprints 346. In some examples, three-dimensional print module 344 may be a stand-alone application, service, or module executing at three-dimensional printer 300 and in other examples, three-dimensional print module 344 may be a sub-component of an operating system controlling operation of three-dimensional printer 300. For example, three-dimensional print module 344 may be integrated into a banking application or third-party application executing at three-dimensional printer 300. In other examples, three-dimensional print module 344 may be a stand-alone application or subroutine that is invoked by an application or operating platform of three-dimensional print module 344 any time an application or operating platform performs 3D printing operations. In some examples, three-dimensional printer 300 may download and install three-dimensional print module 344 from an application repository of a service provider (e.g., via the Internet). In other examples, three-dimensional print module 344 may be preloaded as part of the operating system of three-dimensional printer 300.

One or more storage devices 340 within three-dimensional printer 300 may store information for processing during operation of computing device 300. In some examples, one or more storage devices 340 are temporary memories, meaning that a primary purpose of the one or more storage devices is not long-term storage. Storage devices 340 on three-dimensional printer 300 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 340, in some examples, also include one or more computer-readable storage media. Storage devices 340 may be configured to store larger amounts of information than volatile memory. Storage devices 340 may further be configured for long-term storage of information as non-volatile memory space and retain information after activate/off cycles.

As described in connection with FIG. 2, examples of non-volatile memories include magnetic hard discs, optical discs, floppy discs, flash memories, or forms of electrically programmable memories (EPROM) or electrically erasable and programmable (EEPROM) memories. Storage devices 340 may store program instructions and/or data associated with UI module 342, three-dimensional print module 344, and/or blueprints 346.

Three-dimensional object generation module 302 performs the process of constructing or fabricating a three-dimensional object under control of one or more processors 332 in accordance with one or more aspects of the present disclosure. There may be a number of ways in which three-dimensional object generation module 302 may operate, but in one example, processors 332 and/or three-dimensional object generation module 302 may analyze a blueprint of a 3D model, and determine the dimensions and/or specifications of numerous horizontal layers of the object. Each of these layers can be considered a thinly-sliced horizontal cross-section of a three-dimensional object. To generate the three-dimensional object from the numerous cross-sections, three-dimensional object generation module 302 lays down successive layers of material, each layer corresponding to one of the thinly-sizzled cross-sections of the object, until the entire three-dimensional object is created.

In some examples, three-dimensional object 350 may be an object without any built-in intelligence. In other examples, three-dimensional object 350 may have some intelligent features. For example, three-dimensional object 350 may include a device preloaded with rules enabling the purchase of other objects. In other examples, three-dimensional object 350 may be capable of communicating with other objects or other devices, including mobile device 200, or three-dimensional printer 300. In still further examples, three-dimensional object 350 may include features enabling it to exhibit artificial intelligence attributes.

In operation, and with reference to FIG. 3 and the description of FIG. 1, three-dimensional printer 300 may receive over communication unit 316 a set of instructions or one or more blueprints 346 over network 180, along with a command to print one or more three-dimensional objects as specified in blueprints 346. Three-dimensional print module 344 may cause blueprints 346 may be stored in storage devices 340. Three-dimensional print module 344 may process blueprints 346 and decrypt any encrypted information in blueprints 346, and/or may verify permissions relating to any restrictions as to how many or in what manner three-dimensional objects can be printed from one or more blueprints 346. Three-dimensional print module 344 may access one or more blueprints 346 and control three-dimensional object generation modules 302 to generate, print, fabricate, or otherwise produce one or more three-dimensional objects specified by one or more blueprints 346. In some examples, three-dimensional printer 300 may create multiple objects (or "printed 3D objects") from one or more blueprints 346.

In one or more of the examples described in connection with FIG. 1, mobile device 200 is described as detecting information relating to its surroundings, context, and/or environment. In other examples, three-dimensional printer 300 may detect information relating to its surroundings, context, and/or environment. Such information could include audio information, visual or image information, location information, and/or other information. Three-dimensional printer 300 may detect such information often, in some cases continuously or close to continuously, and even when a user is not actively interacting with three-dimensional printer 300. Based on such information, three-dimensional printer 300 and/or another device may be able to determine an appropriate and/or attractive offer to print a three-dimensional object that may be of interest to a user of three-dimensional printer 300 or an owner of three-dimensional printer 300. Three-dimensional printer 300 may present the offer to the user automatically, as a push notification. Such a notification may be presented by mobile device 200, by three-dimensional printer 300, or by another device. Thus, in some examples, mobile device 200 or three-dimensional printer 300 may present the offer without a specific request for it, and in some cases, the offer may be a surprise to the user. In some examples, if three-dimensional printer 300 determines or detects that the offer has been accepted, three-dimensional printer 300 may print the offered three-dimensional object. In such examples, mobile device 200 may have a reduced role, and in other examples, mobile device 200 might not be necessary.

FIG. 4 is a conceptual diagram illustrating a graphical user interface of an example mobile device 200 that may present an example purchase notification 404 in accordance with one or more aspects of the present disclosure. The graphical user interface presented at presence-sensitive panel 201 of FIG. 4 may correspond to a graphical user interface output by mobile device 200 of FIG. 1 and FIG. 2. For purposes of illustration, some aspects of FIG. 4 may be described within the context of mobile device 200 of FIG. 1 and FIG. 2. FIG. 4 illustrates an example graphical user interface; many other examples of graphical user interfaces may be used or presented in other instances or examples.

In some examples, mobile device 200 may detect input or contextual information from one or more input devices associated with mobile device 200. For example, audio sensor 204 may detect audio information, and audio sensor 204 may output an indication of audio input to offer module 244. Offer module 244 may determine, based on the indication of audio input, that the audio information corresponds to the movie "New Age Wars." Offer module 244 within mobile device 200 may also determine, based on the indication of input and/or other contextual information, that the movie has just completed. In response, offer module 244 may determine that purchase notification 404 is an appropriate offer in this situation, and offer module 244 may cause UI module 242 to update the graphical user interface displayed at presence-sensitive panel 201 so that it appears as shown in FIG. 4. Offer module 244 may also or alternatively cause mobile device 200 to play a sound, provide physical or tactile feedback, or otherwise perform an action that may alert the user to purchase notification 404.

As illustrated in FIG. 4, purchase notification 404 invites the user to purchase an action figure for $8.99. The action figure may be of interest to the user if the action figure is associated with a character of the "New Age Wars" movie that has just completed. Presence-sensitive panel 201 may detect user inputs at or near a location of presence-sensitive panel 201 where presence-sensitive panel 201 presents accept button 406, and presence-sensitive panel 201 may output to UI module 242 an indication of user input detected by presence-sensitive panel 201. UI module 242 may output to offer module 244 information about the input, and offer module 244 may determine, based on the information about the input, that the offer presented in purchase notification 404 has been accepted. Offer module 244 may communicate over network 180 to offer server 150 that purchase notification 404 has been accepted, and offer module 244 may further communicate a particular size, selection, or color of the action figure, attributes which may be specified by the user through further input detected by mobile device 200. In response to receiving such information, offer server 150 may enable printing the offered action figure by, for example, three-dimensional printer 300. For example, offer server 150 may send to three-dimensional printer 300 one or more blueprints, plans, or other information that may be used by three-dimensional printer 300 to print the offered action figure. In other examples, such as when three-dimensional printer 300 has access to appropriate blueprints, plans, or other information sufficient to print the offered action figure, offer server 150 may send a command or an authorization code to three-dimensional printer 300. The resulting action figure may be printed by three-dimensional printer 300 having the size and/or color attributes chosen by the user.

The example of FIG. 4 involves a purchase transaction, so offer module 244 may also access bank account information stored within storage device 240 and cause the appropriate amount (e.g., $8.99 along with any tax or service fee) to be deducted from the user's bank account. Such tax may be calculated based on geolocation information determined by mobile device 200. In another example, offer module 244 may cause payment to be processed in another way, such as by directing another device, such as offer server 150, to cause the appropriate amount to be deducted from a specific bank account.

In an example where the offer is not accepted, presence-sensitive panel 201 may detect user inputs at or near a location of presence-sensitive panel 201 where presence-sensitive panel 201 presents decline button 408, and presence-sensitive panel 201 may output to UI module 242 an indication of user input detected by presence-sensitive panel 201. UI module 242 may output to offer module 244 information about the input, and offer module 244 may determine, based on the information about the input, that the offer presented in purchase notification 404 has been declined. In that situation, offer module 244 may cause UI module 242 to remove purchase notification 404 from the user interface presented at presence-sensitive panel 201.

In another alternative, presence-sensitive panel 201 may detect user inputs at or near a location of presence-sensitive panel 201 where presence-sensitive panel 201 presents defer button 410 (labeled "not now" in FIG. 4), and presence-sensitive panel 201 may output to UI module 242 an indication of user input detected by presence-sensitive panel 201. UI module 242 may output to offer module 244 information about the input, and offer module 244 may determine, based on the information about the input, that the offer presented in purchase notification 404 has been deferred, or in other words, the user may have chosen the defer button 410, indicating that the user does not yet wish to accept or decline purchase notification 404. In response, offer module 244 may cause UI module 242 to remove purchase notification 404 from the user interface presented at presence-sensitive panel 201, and may include information relating to purchase notification 404 elsewhere, such as in pending offers tab 422.

Figure 5:
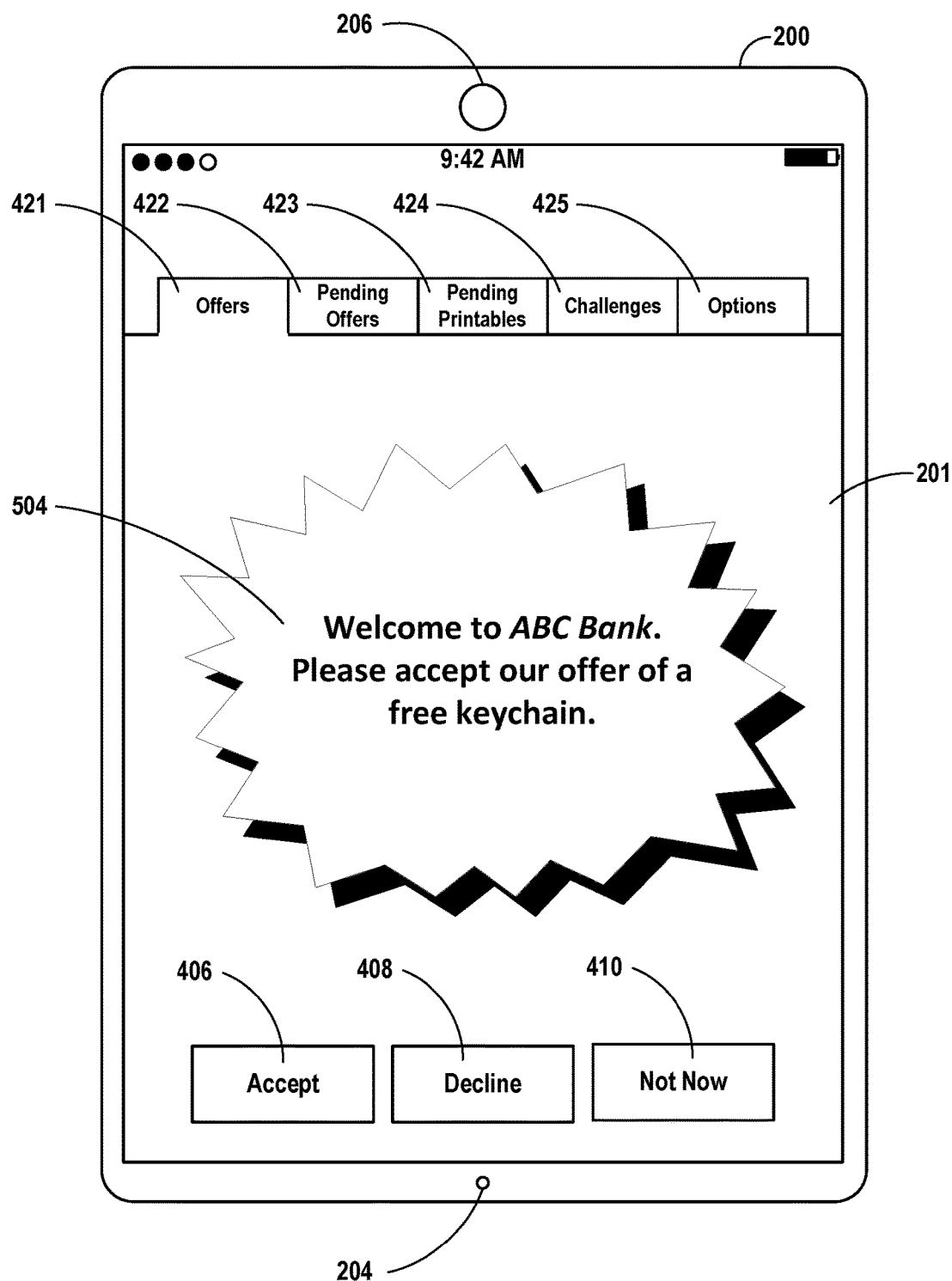
FIG. 5 is a conceptual diagram illustrating a graphical user interface of an example mobile device that may present an example non-purchase notification in accordance with one or more aspects of the present disclosure.

FIG. 5 is a conceptual diagram illustrating a graphical user interface of an example mobile device 200 that may present an example non-purchase notification 504 in accordance with one or more aspects of the present disclosure. The graphical user interface presented at presence-sensitive panel 201 of FIG. 5 may correspond to a graphical user interface output by mobile device 200 of FIG. 1 and FIG. 2. For purposes of illustration, some aspects of FIG. 5 may be described within the context of mobile device 200 of FIG. 1 and FIG. 2. FIG. 5 illustrates an example graphical user interface; many other examples of graphical user interfaces may be used or presented in other instances or examples.

With reference to FIG. 5, mobile device 200 may detect input or contextual information from one or more input devices associated with mobile device 200. For example, geolocation module 208 may detect input in the form of location information or a time window of location information, and geolocation module 208 may output an indication of location information to offer module 244. Offer module 244 may determine, based on the indication of location information and/or other information, that mobile device 200 has just arrived at a particular location. In response, offer module 244 may determine an appropriate offer, and offer module 244 may cause UI module 242 to update the graphical user interface displayed at presence-sensitive panel 201 so that it appears as shown in FIG. 5. Offer module 244 may also or alternatively cause mobile device 200 to play a sound, provide physical or tactile feedback, or otherwise perform an action that may alert the user to non-purchase notification 504. When non-purchase notification 504 is displayed, mobile device 200 may cause purchase notification 404 to be removed from the user interface presented at presence-sensitive panel 201, but in other examples, mobile device 200 may continue to present purchase notification 404 at presence-sensitive panel 201; in other examples, mobile device 200 may continue to present some aspect of purchase notification 404.

Non-purchase notification 504 invites the user to accept a free offer. Mobile device 200 may present accept button 406, decline button 408, and defer button 410 within the graphical user interface presented at presence-sensitive panel 201. Mobile device 200 may detect user inputs at or near a location of presence-sensitive panel 201 where presence-sensitive panel 201 presents accept button 406, decline button 408, or defer button 410. Mobile device 200 may determine, based on the input, that the user has accepted the offer, declined the offer, or deferred the offer.

Figure 6:
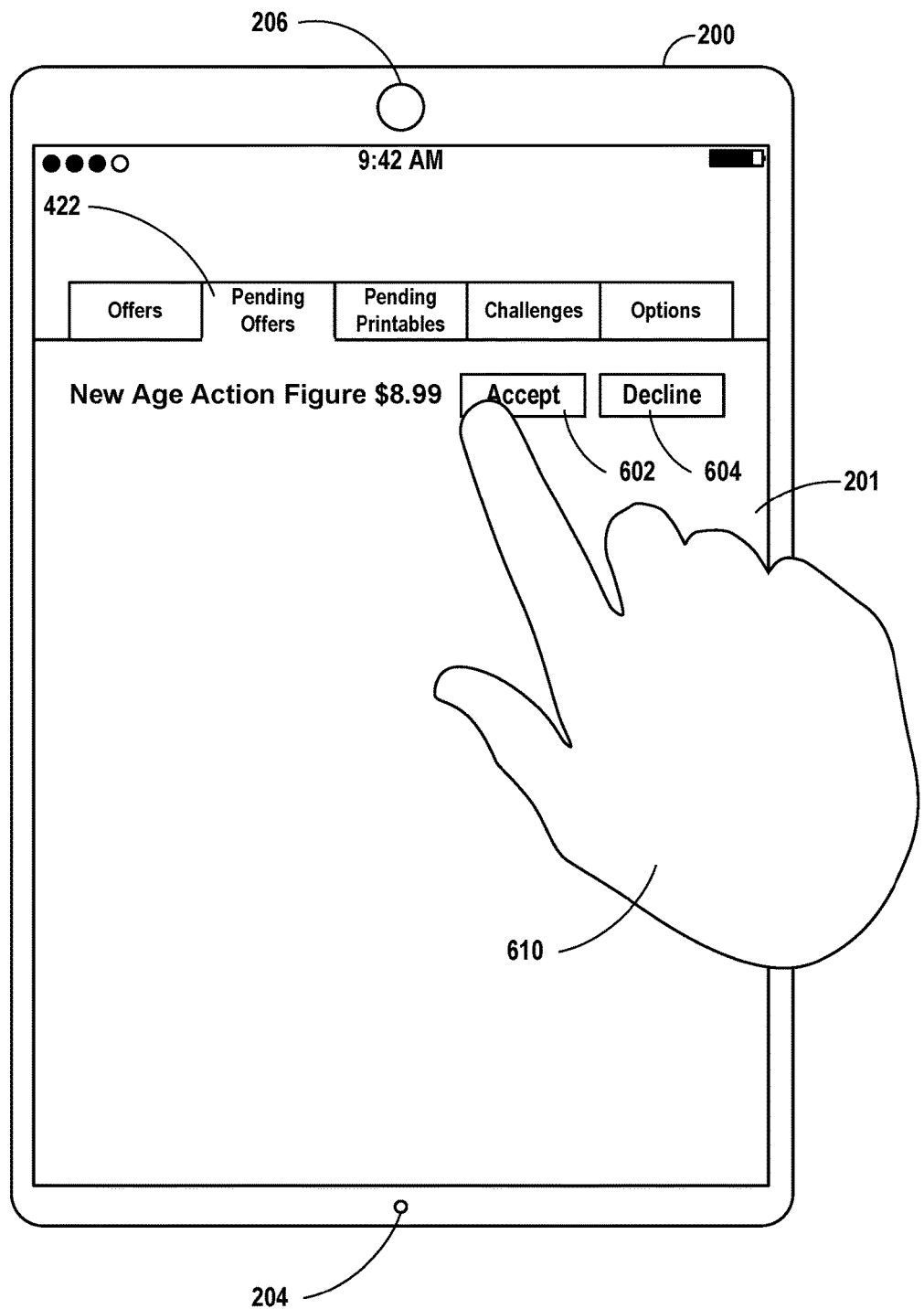
FIG. 6 is a conceptual diagram illustrating a graphical user interface of an example mobile device that may present an example pending offers tab and related information in accordance with one or more aspects of the present disclosure.

FIG. 6 is a conceptual diagram illustrating a graphical user interface of an example mobile device 200 that may present an example pending offers tab 422 and related information in accordance with one or more aspects of the present disclosure. For purposes of illustration, some aspects of FIG. 6 may be described within the context of mobile device 200 of FIG. 1, FIG. 2, and FIG. 5. FIG. 6 illustrates an example graphical user interface; many other examples of graphical user interfaces may be used or presented in other instances or examples.

Referring again to FIG. 5, presence-sensitive panel 201 may detect inputs at or near a location of presence-sensitive panel 201 where presence-sensitive panel 201 presents pending offers tab 422, and presence-sensitive panel 201 may output to UI module 242 an indication of user input detected by presence-sensitive panel 201. UI module 242 may output to offer module 244 information about the input, and offer module 244 may determine, based on the information about the input, that pending offers tab 422 has been selected. In response, offer module 244 may cause UI module 242 to update the graphical user interface displayed at presence-sensitive panel 201 so that it appears as shown in FIG. 6. Pending offers tab 422 may include a list of one or more pending offers, and may include the action figure corresponding to purchase notification 404 of FIG. 4. In the example shown, if mobile device 200 determined, in connection with FIG. 4, that the user selected defer button 410 in FIG. 4, pending offers tab 422 may be updated as shown in FIG. 6 to include information corresponding to purchase notification 404. Presence-sensitive panel 201 in FIG. 6 presents a user interface that may enable the user to accept or decline purchase notification 404. In such an example, mobile device 200 may detect input at or near a location of presence-sensitive panel 201 where presence-sensitive panel 201 presents accept button 602 in FIG. 6, and may determine, based on such input, that the user has accepted the offer. (Note hand 610 selecting accept button 602 in FIG. 6.) Mobile device 200 may communicate an indication of acceptance over network 180, perform payment processing, and enable the offered three-dimensional object to be printed at three-dimensional printer 300.

Alternatively, mobile device 200 may detect input at or near a location of presence-sensitive panel 201 where presence-sensitive panel 201 presents decline button 604 in FIG. 6, and may determine, based on such input, that the user has declined the offer. Mobile device 200 may communicate an indication declining the offer over the network, and may remove the offer from the list of pending offers in pending offers tab 422.

Figure 7:
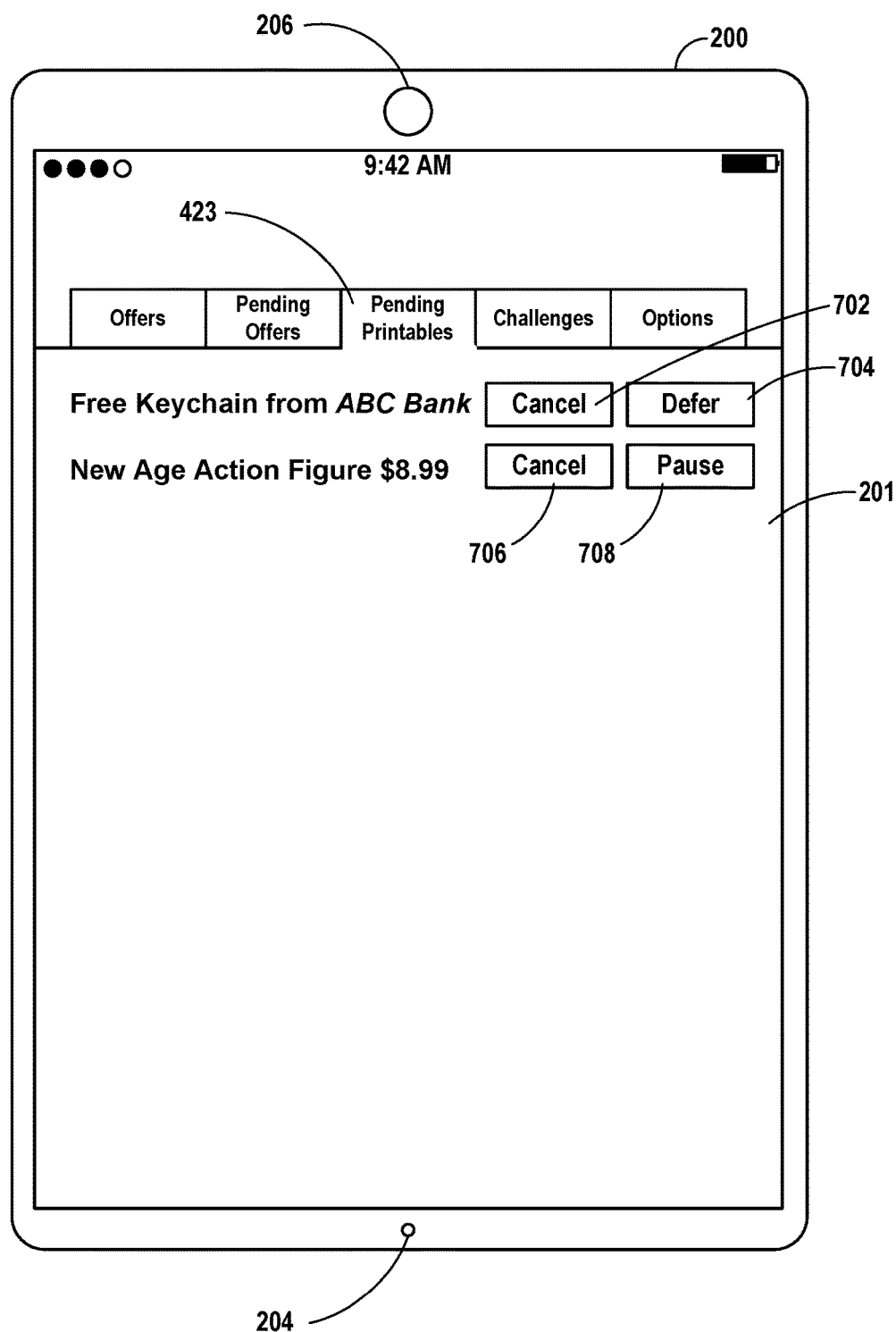
FIG. 7 is a conceptual diagram illustrating a graphical user interface of an example mobile device that may present an example pending printables tab and related information in accordance with one or more aspects of the present disclosure.

FIG. 7 is a conceptual diagram illustrating a graphical user interface of an example mobile device 200 that may present an example pending printables tab 423 and related information in accordance with one or more aspects of the present disclosure. For purposes of illustration, some aspects of FIG. 7 may be described within the context of mobile device 200 of FIG. 1, FIG. 2, and FIG. 5. FIG. 7 illustrates an example graphical user interface; many other examples of graphical user interfaces may be used or presented in other instances or examples.

Referring again to FIG. 5, presence-sensitive panel 201 may detect user inputs at or near a location of presence-sensitive panel 201 where presence-sensitive panel 201 presents pending printables tab 423, and presence-sensitive panel 201 may output to UI module 242 an indication of user input detected by presence-sensitive panel 201. UI module 242 may output to offer module 244 information about the input, and offer module 244 may determine, based on the information about the input, that pending printables tab 423 has been selected. In response, offer module 244 may cause UI module 242 to update the graphical user interface displayed at presence-sensitive panel 201 so that it appears as shown in FIG. 7. Pending printables tab 423 presents a list of pending printables, which may include information relating to both purchase notification 404 of FIG. 4 (e.g., if accepted in FIG. 4) and non-purchase notification 504 of FIG. 5 (e.g., if accepted in FIG. 5).

In some examples, mobile device 200 may present within pending printables tab 423 a list of objects that have been queued to be printed at three-dimensional printer 300. Mobile device 200 may present various options that may be performed relating to queued items. For example, mobile device 200 may detect user input that it determines corresponds to selection of cancel button 702, and in response, mobile device 200 may cancel printing the "Free Keychain from ABC Bank" object and/or prevent the object from being printed. Alternatively, mobile device 200 may detect user input that it determines corresponds to selection of defer button 704, and in response, mobile device 200 may defer printing the "Free Keychain from ABC Bank." In some examples, deferring a print may temporarily suspend printing by three-dimensional printer 300, so that three-dimensional printer 300 may perform the printing at a later time, such as when a user is at home to monitor the printing or to confirm that three-dimensional printer 300 has adequate supplies or is otherwise in working order. Mobile device 200 may also detect user input that it determines corresponds to a selection of pause button 708, and in response, mobile device 200 may pause the printing of the "New Age Action Figure." In some examples, pausing the printing may interrupt printing while printing is taking place, whereas deferring printing might not be available once printing commences. In other examples, options may be available to change printers, change the number of objects to print, and/or configure various settings relating to how an object is printed.

In some examples described herein, mobile device 200 has been illustrated as presenting a graphical user interface with on-screen virtual buttons, as are often used on devices such as presence-sensitive panel 201, although in other examples, mobile device 200 may include one or more physical buttons or other user interface elements. Mobile device 200 may also or alternatively present a voice-activated interface or gesture-activated interface, or other type of user interface. Also, although mobile device 200 is shown as having the form of a mobile device or tablet, mobile device 200 may take other forms in other examples. For example, mobile device 200 may take the form of a watch, or any other type of wearable, non-wearable, mobile, non-mobile, or other type of computing device.

Figure 8:
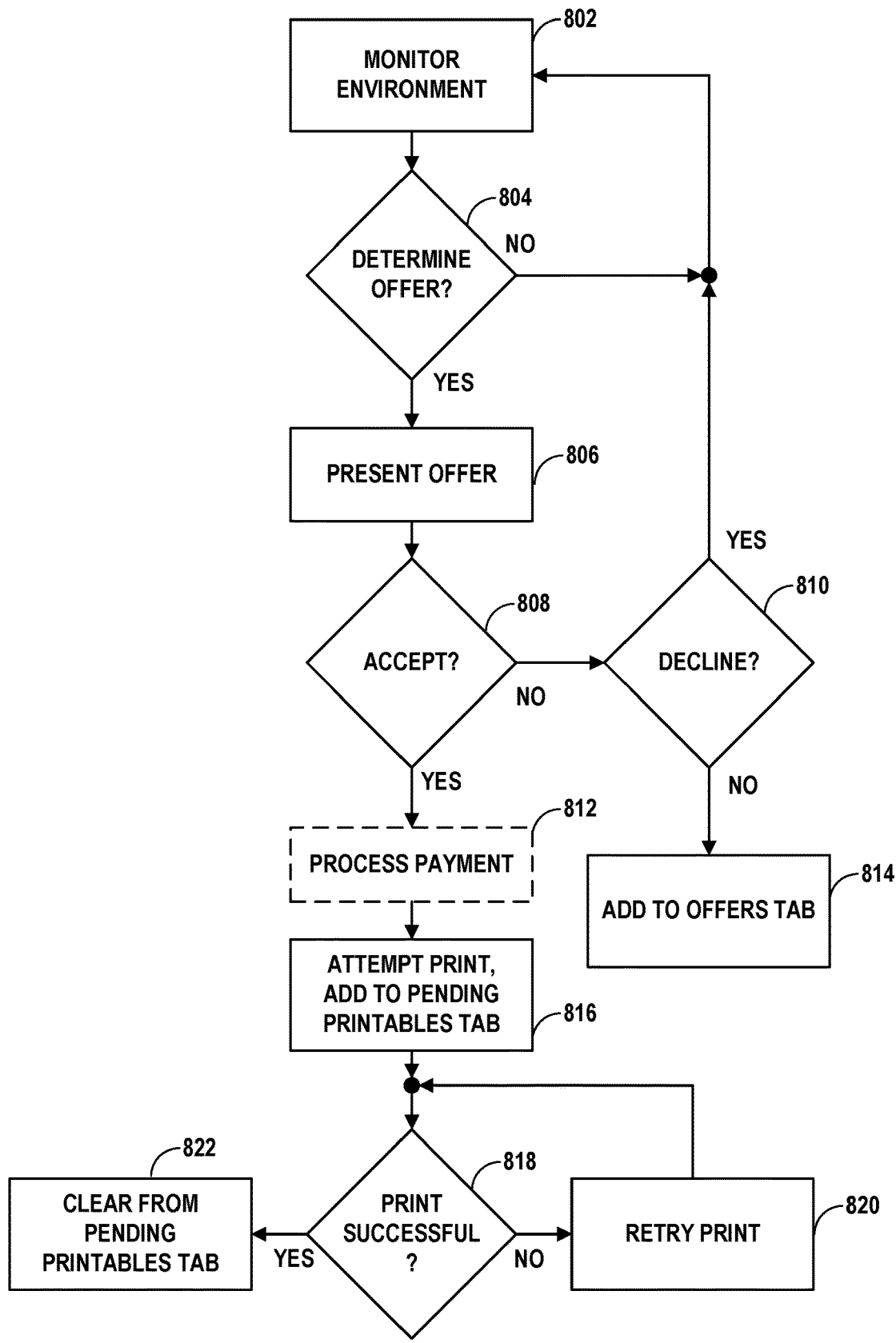
FIG. 8 is a flowchart illustrating example operations of an example mobile device that presents offers to print three-dimensional objects based at least in part on contextual and/or environmental information in accordance with one or more aspects of the present disclosure.

FIG. 8 is a flowchart illustrating example operations of an example mobile device 200 that presents offers to print three-dimensional objects based at least in part on contextual and/or environmental information in accordance with one or more aspects of the present disclosure. For purposes of illustration, FIG. 8 is described within the context of mobile device 200 of FIG. 1, FIG. 2, and FIG. 5.

In the example of FIG. 8, mobile device 200 may monitor contextual information or information about its environment by, for example, monitoring input component 203, audio sensor 204, camera 206, geolocation module 208, and/or input devices 210 (802). Mobile device 200 may determine, based on such information, an offer (804). For example, mobile device 200 may determine that an offer for a free keychain from ABC Bank may be appropriate, based on input indicating that mobile device 200 just arrived at an ABC Bank office. Mobile device 200 may present the offer, such as by displaying it on a display screen associated with mobile device 200 (806). Mobile device 200 may detect that the user has accepted the offer, such as by detecting voice or physical input at mobile device 200 (808).

If the offer is accepted, mobile device 200 may process payment for objects requiring a payment. Mobile device 200 may process payment by accessing bank information stored on mobile device 200 and/or communicating with the user's bank over network 180 (812). Although not shown in FIG. 8, in some examples involving payment processing an additional payment confirmation step may be desirable or required. Also, note that for non-payment offers or notifications, payment might not be necessary (dashed lines around 812). Mobile device 200 may add an entry to pending printables tab 423 and cause the offered object to be printed at three-dimensional printer 300 (816). Mobile device 200 may communicate with three-dimensional printer 300 during and/or after the object is printed, and mobile device 200 may monitor or control the printing process performed by three-dimensional printer 300 (818). Mobile device 200 may determine that the object printed successfully, and may remove the corresponding entry from pending printables tab 423 (822). If printing does not succeed, mobile device 200 may retry the print operation at three-dimensional printer 300 (820).

In some examples, if the offer is not accepted and mobile device 200 determines that the user has declined the offer (810), the object is not printed. For example, mobile device 200 may detect input that it determines corresponds to selection of decline button 408 in FIG. 5. If the offer is not accepted and not declined (e.g., mobile device 200 determines that defer button 410 in FIG. 5 was selected), an entry may be added to pending offers tab 422 (814).

Figure 9:
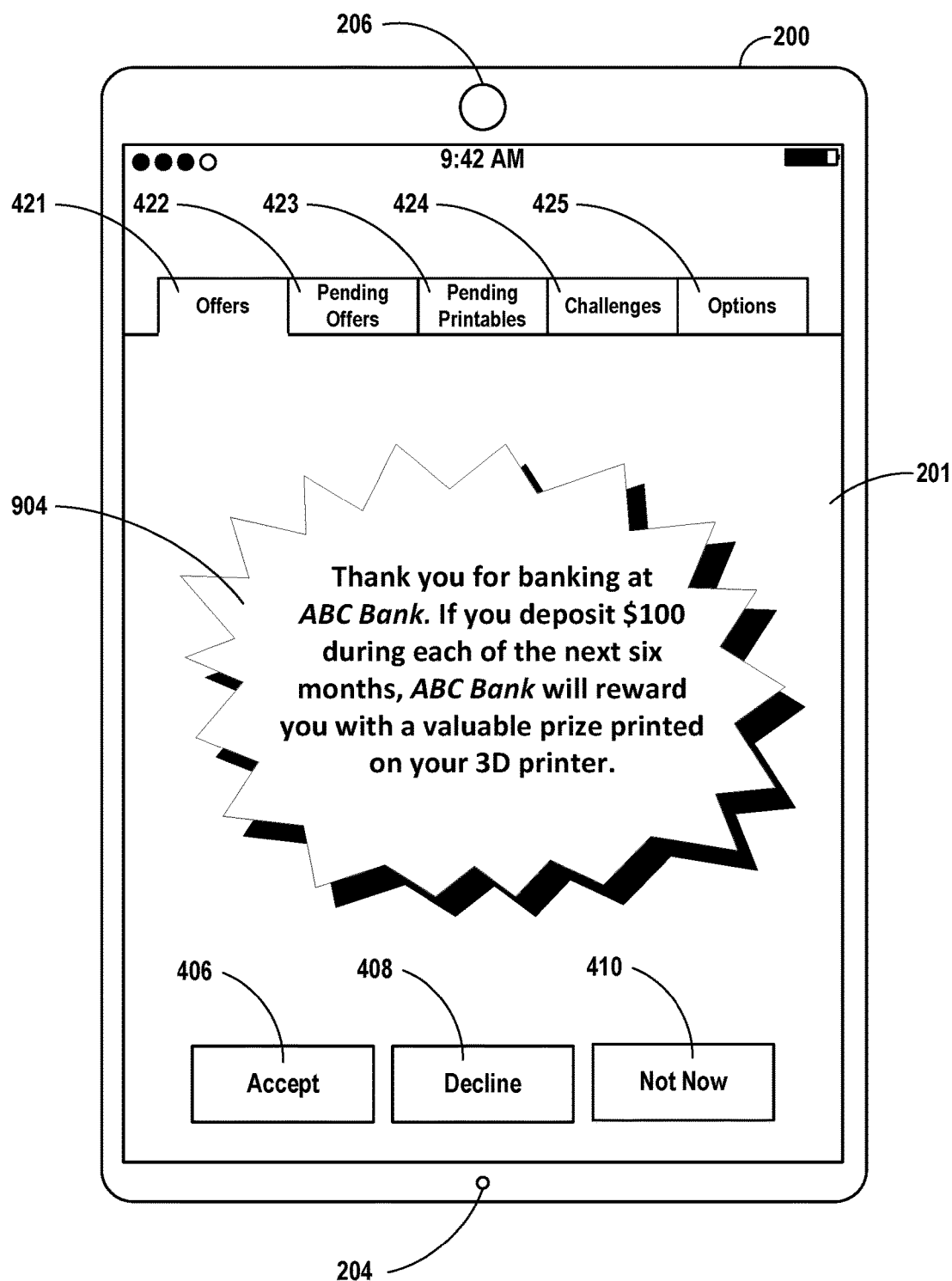
FIG. 9 is a conceptual diagram illustrating a graphical user interface of an example mobile device that may present an example challenge notification in accordance with one or more aspects of the present disclosure.

FIG. 9 is a conceptual diagram illustrating a graphical user interface of an example mobile device 200 that may present an example challenge notification 904 in accordance with one or more aspects of the present disclosure. The graphical user interface presented at presence-sensitive panel 201 of FIG. 9 may correspond to a graphical user interface output by mobile device 200 of FIG. 1 and FIG. 2. For purposes of illustration, some aspects of FIG. 9 may be described within the context of mobile device 200 of FIG. 1 and FIG. 2. FIG. 9 illustrates an example graphical user interface; many other examples of graphical user interfaces may be used or presented in other instances or examples.

With reference to FIG. 9, mobile device 200 may detect input or contextual information from one or more input devices associated with mobile device 200. For example, offer module 244 may detect information indicating that the money was recently deposited in a savings account at ABC Bank, and offer module 244 may further determine that the relevant savings account is linked to a mobile banking application stored on mobile device 200. Offer module 244 may be able to make this determination if offer module 244 has access to the user's accounts at ABC Bank, or offer module 244 may make this determination based on an email receipt received by mobile device 200 or other information available to mobile device 200. Other examples are possible. Offer module 244 may further determine, based on this information, an appropriate challenge offer, and offer module 244 may cause UI module 242 to update the graphical user interface displayed at presence-sensitive panel 201 so that it appears as shown in FIG. 9. Offer module 244 may also or alternatively cause mobile device 200 to play a sound, provide physical or tactile feedback, or otherwise perform an action that may alert the user to challenge notification 904.

Challenge notification 904 may be considered a challenge to perform future actions, including milestones (e.g., deposits each month) leading to completion of the challenge, and challenge notification 904 may invite the user to accept the challenge. Mobile device 200 may present accept button 406, decline button 408, and defer button 410 on the graphical user interface presented at presence-sensitive panel 201. Mobile device 200 may detect user inputs at or near a location of presence-sensitive panel 201 where presence-sensitive panel 201 presents accept button 406, decline button 408, or defer button 410. Mobile device 200 may determine, based on the input, that the user has accepted the challenge, declined the challenge, or deferred the challenge. In the example shown in FIG. 9, challenge notification 904 does not specify the three-dimensional object that will be printed, and simply characterizes the object as a "valuable prize." In other examples, challenge notification 904 may describe one or more objects serving as a reward in more detail.

Figure 10:
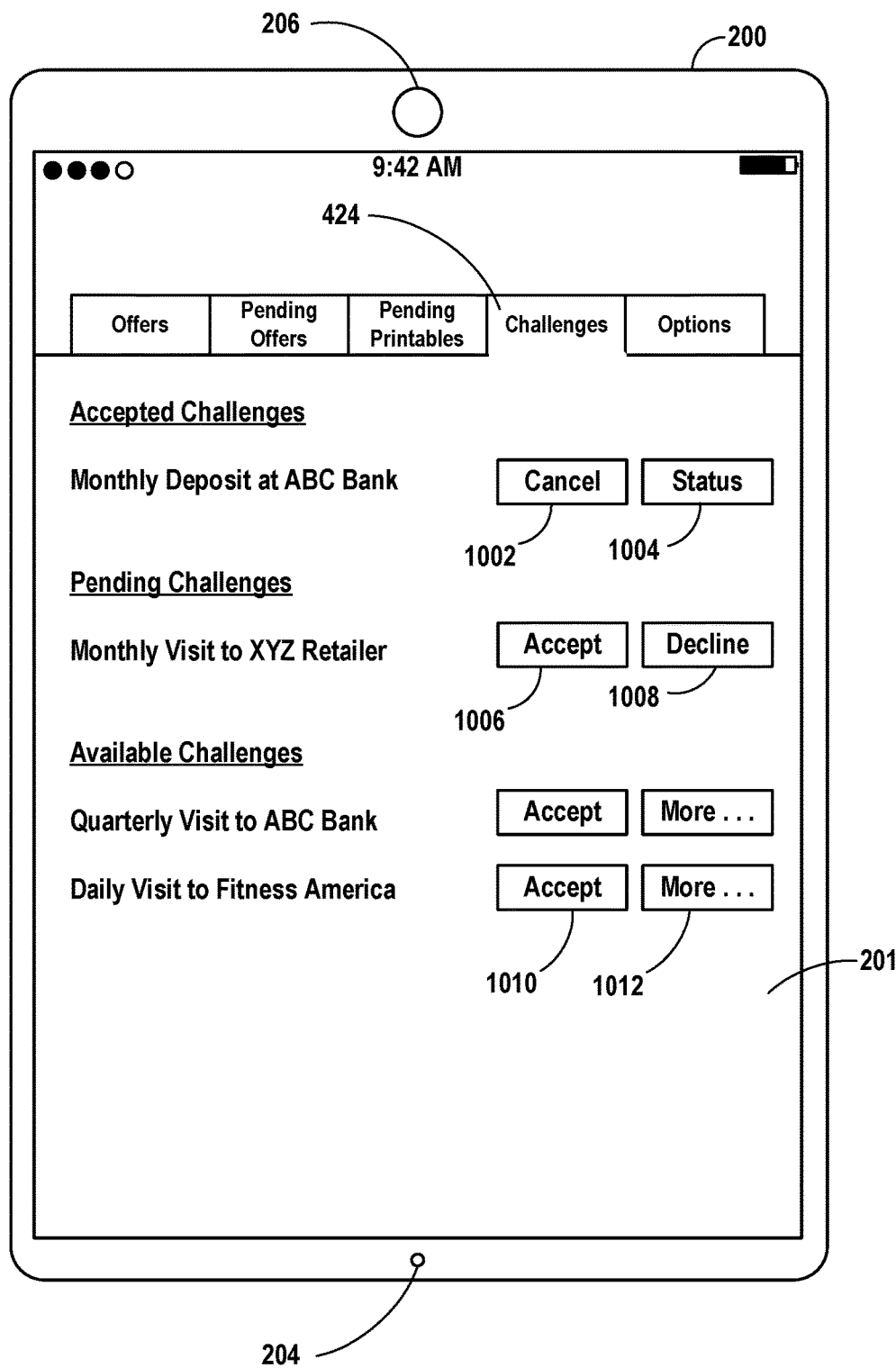
FIG. 10 is a conceptual diagram illustrating a graphical user interface of an example mobile device that may present an example challenges tab and related information in accordance with one or more aspects of the present disclosure.

FIG. 10 is a conceptual diagram illustrating a graphical user interface of an example mobile device 200 that may present an example challenges tab 424 and related information in accordance with one or more aspects of the present disclosure. For purposes of illustration, some aspects of FIG. 10 may be described within the context of mobile device 200 of FIG. 1, FIG. 2, and FIG. 5. FIG. 10 illustrates an example graphical user interface; many other examples of graphical user interfaces may be used or presented in other instances or examples.

Referring again to FIG. 5, presence-sensitive panel 201 may detect user inputs at or near a location of presence-sensitive panel 201 where presence-sensitive panel 201 presents challenges tab 424, and presence-sensitive panel 201 may output to UI module 242 an indication of user input detected by presence-sensitive panel 201. UI module 242 may output to offer module 244 information about the input, and offer module 244 may determine, based on the information about the input, that challenges tab 424 has been selected. In response, offer module 244 may cause UI module 242 to update the graphical user interface displayed at presence-sensitive panel 201 so that it appears as shown in FIG. 10.

In some examples, mobile device 200 may present within challenges tab 424 a list of challenges, including accepted challenges, pending challenges, and available challenges. Accepted challenges may include those challenges that mobile device 200 may have previously presented at presence-sensitive panel 201, such as in FIG. 9, and where mobile device 200 has detected an indication of user input selecting accept button 406 in FIG. 9. In FIG. 10, mobile device 200 may detect input that it determines corresponds to selection of cancel button 1002, and in response, mobile device 200 may cancel the corresponding challenge and may stop monitoring completion of the conditions of the challenge. Mobile device 200 may alternatively detect input that it determines corresponds to selection of status button 1004, and in response to that input, mobile device 200 may present status information (e.g., tasks completed, tasks not yet completed, any due dates, etc.) for that challenge.

Pending challenges may include those that mobile device 200 may have previously presented in some way, yet mobile device 200 has detected neither acceptance nor declination. In some examples, pending challenges may correspond to those where a user has selected a "not now" button. For one such pending challenge listed in challenges tab 424, mobile device 200 may detect input that it determines corresponds to selection of accept button 1006, and in response, mobile device 200 may communicate acceptance of this challenge over network 180 to offer server 150, and may update presence-sensitive panel 201 to list the corresponding challenge ("Monthly Visit to XYZ Retailer") to be listed under the "Accepted Challenges" heading. Offer module 244 within mobile device 200 may also begin monitoring this challenge for compliance and completion.

Available challenges may include those that mobile device 200 might not have yet presented by mobile device 200 or otherwise, but which may be relevant to activities, context, or environmental information detected by mobile device 200. In some examples, mobile device 200 may present available challenges as tasks that can be done today to earn rewards, bonus points, or a prize.

Mobile device 200 may detect input that it determines corresponds to selection of button 1012, and in response, mobile device 200 may present further information about the corresponding challenge ("Daily Visit to Fitness America"). Mobile device 200 may detect input that it determines corresponds to selection of accept button 1010, and in response, mobile device 200 may communicate acceptance of this challenge over network 180 to offer server 150, and may update presence-sensitive panel 201 to list the corresponding challenge ("Daily Visit to Fitness America") under the "Accepted Challenges" heading. Offer module 244 within mobile device 200 may also begin monitoring this challenge for compliance, milestones, and completion.

In some examples, an object previously printed may play a role in determining progress towards completing conditions of a challenge presented within challenges tab 424. For example, a keychain printed by three-dimensional printer 300 may be scanned each time a user enters the Fitness America gym. The scanner at the gym may communicate information about the scan to cloud server 140 or offer server 150. Cloud server 140 and/or offer server 150 may use the information about the scan to determine how many days in a row that user visited the gym. Mobile device 200 may receive progress information from cloud server 140 and/or offer server 150 and include such information within challenges tab 424.

In another example, the keychain printed by three-dimensional printer 300 may include intelligent capabilities, such as geolocation-sensing capabilities. In such an example, the keychain may determine, based on the geolocation information detected by the keychain, that the keychain has (and therefore, likely the user) has entered the gym. The keychain may, by itself or in conjunction with one or more additional devices, track such information and deduce how many days in a row the user has visited the gym. The keychain may present such information to the user. In some examples, the mobile device 200 may receive such information from the keychain, and include such information in challenges tab 424.

In another example, mobile device 200 may detect geolocation that it determines corresponds to a visit to the Fitness America gym. Mobile device 200 may determine, based on the geolocation information detected by mobile device 200, that mobile device 200 (and therefore, the user) has entered the gym. Mobile device 200 may track such information and deduce how many days in a row the user has visited the gym. Mobile device 200 may include such information in challenges tab 424.

Alternatively, mobile device 200 may send information about the detected geolocation information to cloud server 140 and/or offer server 150. Cloud server 140 and/or offer server 150 may use the information about the detected geolocation to determine how many days in a row that user visited the gym. Mobile device 200 may receive progress information from cloud server 140 and/or offer server 150 and include such information within challenges tab 424.

Figure 11:
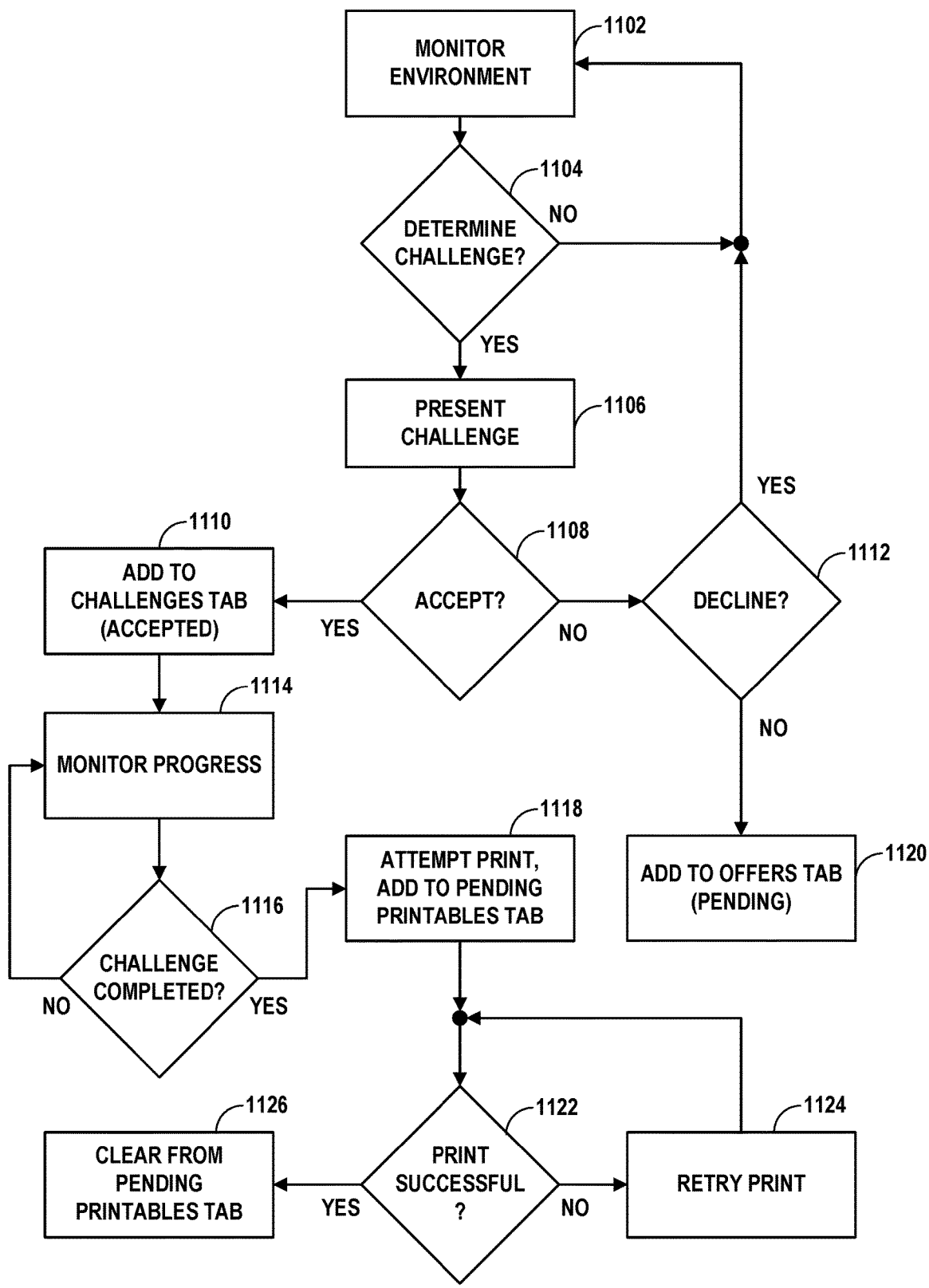
FIG. 11 is a flowchart illustrating example operations of an example mobile device that presents offers to print three-dimensional objects based at least in part on contextual and/or environmental information in accordance with one or more aspects of the present disclosure.

FIG. 11 is a flowchart illustrating example operations of an example mobile device 200 that presents offers to print three-dimensional objects based at least in part on contextual and/or environmental information in accordance with one or more aspects of the present disclosure. For purposes of illustration, FIG. 11 is described within the context of mobile device 200 of FIG. 1, FIG. 2, and FIG. 9.

In the example of FIG. 11, mobile device 200 may monitor contextual information or information about its environment by, for example, monitoring input component 203, audio sensor 204, camera 206, geolocation module 208, and/or input devices 210 (1102). Mobile device 200 may determine, based on such information, a challenge (1104). For example, mobile device 200 may determine that a challenge to make a monthly deposit to an ABC Bank account may be appropriate, based on mobile device 200 determining that a recent deposit was made recently to the ABC Bank account. Mobile device 200 may present the challenge, such as by displaying it on a display screen associated with mobile device 200 (1106). Mobile device 200 may detect that the user has accepted the challenge, such as by detecting voice or physical input at mobile device 200 (1108).

If the challenge is accepted, mobile device 200 may cause information describing the challenge to be added to the user interface associated with a challenge tab, and such information may be presented under an "Accepted Challenges" header, in a manner similar to that shown in FIG. 10 (1110). Mobile device 200 may monitor progress toward completing the challenge, by for example, monitoring a bank account for monthly deposits (1114). Monitoring progress may be performed by mobile device 200, but may alternatively be performed by another computing device, such as cloud server 140, offer server 150, or another device. In another example, mobile device 200 may monitor progress toward completing the challenge in conjunction with one or more other computing devices, including, for example, cloud server 140 and/or offer server 150. In some examples, as progress toward completing the challenge is made, certain milestones may be attained, and in response, mobile device 200 may present additional offers, notifications, or the like at appropriate times, or may print rewards, additional rewards, or the like at appropriate times.

In some examples, if mobile device 200 determines that the challenge has been completed (1116), the offered three-dimensional object may be queued for printing by three-dimensional printer 300. Mobile device 200 may update a graphical user interface so that three-dimensional object is included as one of the pending printables in pending printables tab 423, and mobile device 200 may cause the offered object to be printed by three-dimensional printer 300 (1118). Mobile device 200 may communicate with three-dimensional printer 300 during and/or after the object is printed, and mobile device 200 may monitor or control the printing process at three-dimensional printer 300 (1122). Mobile device 200 may determine that the object printed successfully, and may remove the corresponding entry from pending printables tab 423 (1126). If printing does not succeed, mobile device 200 may retry the print operation at three-dimensional printer 300 (1124).

In some examples, if the challenge is not accepted and mobile device 200 determines that the user has declined the challenge (1112), the object is not printed. For example, mobile device 200 may detect input that it determines corresponds to selection of decline button 408 in FIG. 9. If the challenge is not accepted and not declined (e.g., mobile device 200 determines that defer button 410 in FIG. 9 was selected), an entry may be added to the pending challenges section of challenges tab 424 (1120).

Figure 12:
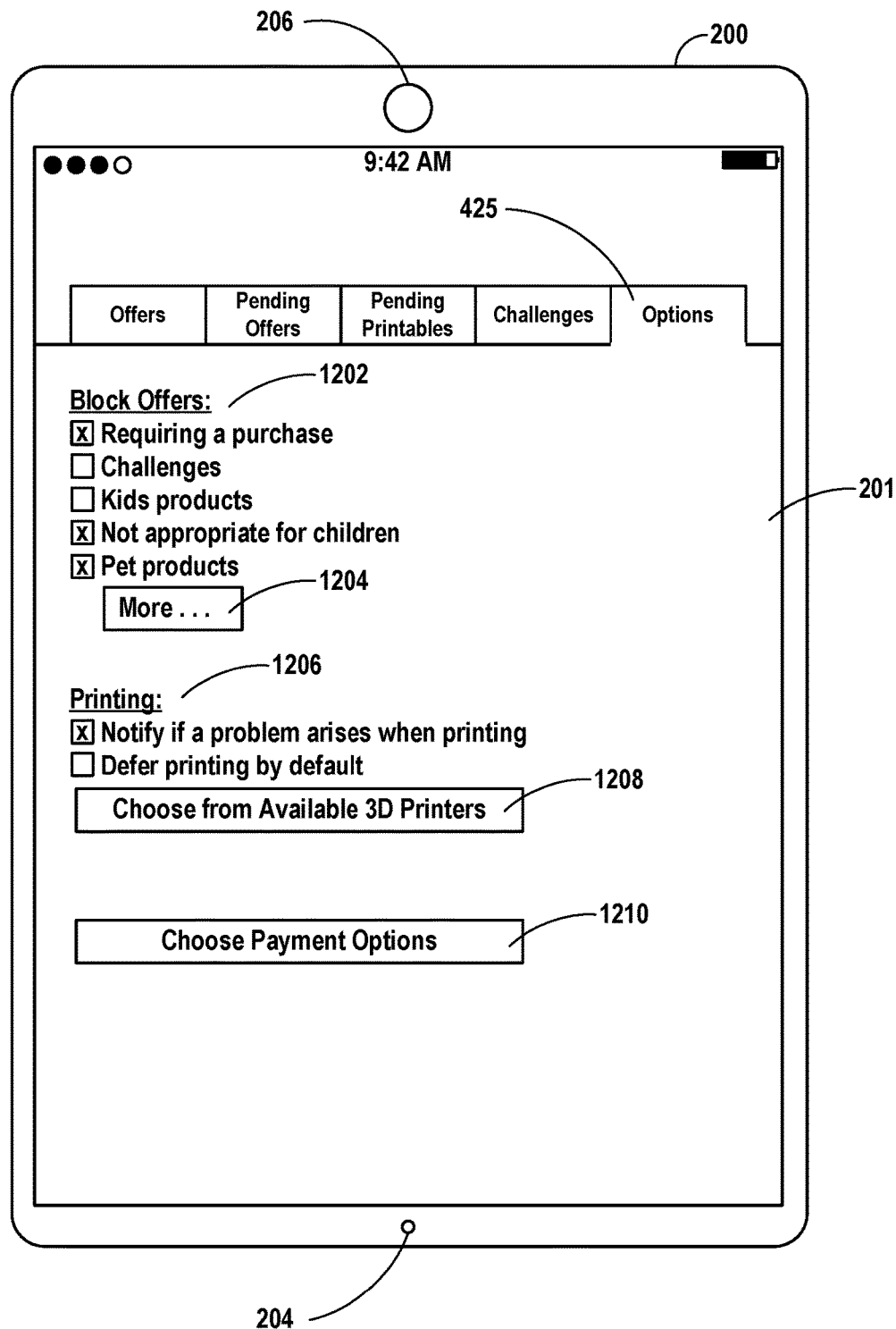
FIG. 12 is a conceptual diagram illustrating a graphical user interface of an example mobile device that may present an example options tab and related information in accordance with one or more aspects of the present disclosure.

FIG. 12 is a conceptual diagram illustrating a graphical user interface of an example mobile device 200 that may present an example options tab 425 and related information in accordance with one or more aspects of the present disclosure. For purposes of illustration, some aspects of FIG. 12 may be described within the context of mobile device 200 of FIG. 1, FIG. 2, and FIG. 5. FIG. 12 illustrates an example graphical user interface; many other examples of graphical user interfaces may be used or presented in other instances or examples.

Referring again to FIG. 5, presence-sensitive panel 201 may detect user inputs at or near a location of presence-sensitive panel 201 where presence-sensitive panel 201 presents options tab 425, and presence-sensitive panel 201 may output to UI module 242 an indication of user input detected by presence-sensitive panel 201. UI module 242 may output to offer module 244 information about the input, and offer module 244 may determine, based on the information about the input, that options tab 425 has been selected. In response, offer module 244 may cause UI module 242 to update the graphical user interface displayed at presence-sensitive panel 201 so that it appears as shown in FIG. 12. In the example of FIG. 12, options tab 425 includes a number of settings that may modify how offer module 244 may operate.

For example, block offers region 1202 is a user interface providing a number of options for blocking particular types of offers or challenges. For example, offer module 244 executing on mobile device 200 may selectively enable offers that require a purchase (e.g., FIG. 4). Offer module 244 executing on mobile device 200 may selectively enable challenges (e.g., FIG. 9). Offer module 244 executing on mobile device 200 may also selectively enable offers for kids' products, products not appropriate for children, and/or pet products. Many other examples may be appropriate and/or available. In operation, mobile device 200 may detect input that it determines corresponds to selection of one or more of the boxes associated with each option, and in response, mobile device 200 may enable or disable the corresponding option.

If mobile device 200 detects input that it determines corresponds to selection of offers options button 1204, mobile device 200 may present additional options relating to which offers or challenges. Such options may allow filtering of the form "more/less from Merchant X" or "no offers from Merchant Y" or similar. Mobile device 200 may also present an option to turn on dynamic filtering, which may include enabling an adaptive learning algorithm that attempts to filter notifications, offers, and/or challenges using a learning algorithm or other algorithm based on explicit preferences, historical preferences, and/or historical behaviors accepting or declining prior notifications, offers, or challenges. In other examples, mobile device 200 may present an option to turn off all filtering so that all notifications, offers, and/or challenges are presented. In another example, mobile device 200 may present an option to turn off all notifications, offers, and/or challenges, so that none are presented, either temporarily (e.g., a "notification snooze" option) or indefinitely.

Print options region 1206 is a user interface providing a number of options relating to how objects are printed. In some examples, offer module 244 operates as a printer interface, controlling certain aspects of how printing operations are performed. Offer module 244 executing on mobile device 200 may monitor printing operations and cause mobile device 200 to present a notification if an error problem is encountered during printing operations. Offer module 244 may also defer printing by default, so that items from, for example, pending printables tab 423 might need specific enabling before a three-dimensional printer generates the corresponding object.

Offer module 244 may be configured for one or more three-dimensional printers 300. Mobile device 200 may detect input that it determines corresponds to selection of printer selection button 1208, and in response, mobile device 200 may present a menu of additional three-dimensional printers 300, including those that may be within proximity of mobile device 200, or which may otherwise be enabled for printing by mobile device 200. Other three-dimensional printers 300 may be available as well, including those at nearby or remote restaurants, post offices, office buildings, service centers, retail stores, or cafes. Three-dimensional printers 300 may be available at a centralized or specialized area, similar to how Internet access has been provided at Internet cafes. Configuring or selecting such printers may be performed in connection with printer selection button 1208, and selection of 3D printers may be performed in a manner similar to how WiFi networks are often selected.

Offer module 244 may also enforce printing rights and permissions, enabling only the authorized number of offered objects to be printed. Offer module 244 may determine if problems arise during printing, and may authorize or gain authorization to reprint a given object, so that an offer to print an object is not spoiled by a printer error, transmission error, or inadequate printer supplies. In some examples, where offer module 244 controls printing rights, permissions, and any required payments, encryption can be built into offer module 244, and digital rights management schemes may be applied to blueprints, instructions, and digital files associated with generating three-dimensional objects by third-party printers. In cases where offer module 244 and/or three-dimensional printer 300 determines that an object has been printed, but a problem is discovered with resulting printed object (e.g., either immediately or within 30 days), a refund or warranty procedure may be implemented. Such a procedure may require that mobile device 200 or another device capture a picture of the defectively printed object, and submit the picture to entity from which the offer originated, or that entity's agent. Remedies may include a refund, or offer module 244 enabling a blueprint for reprinting the object.

Mobile device 200 may detect input that it determines corresponds to selection of payment options button 1210, and in response, mobile device 200 may present a menu of payment option settings. Such settings may enable mobile device 200 to add, delete, or change payment methods in response to user input, and modify how payments are made. Mobile device 200 may, in response to user input, configure whether certain payment confirmations are required, whether payments are automatically deducted from a bank account, and/or whether credit is extended for purchases. Mobile device 200 may also perform other functions relating to payments, including, for example, policing any limitations on purchase frequency or amount.

Figure 13:
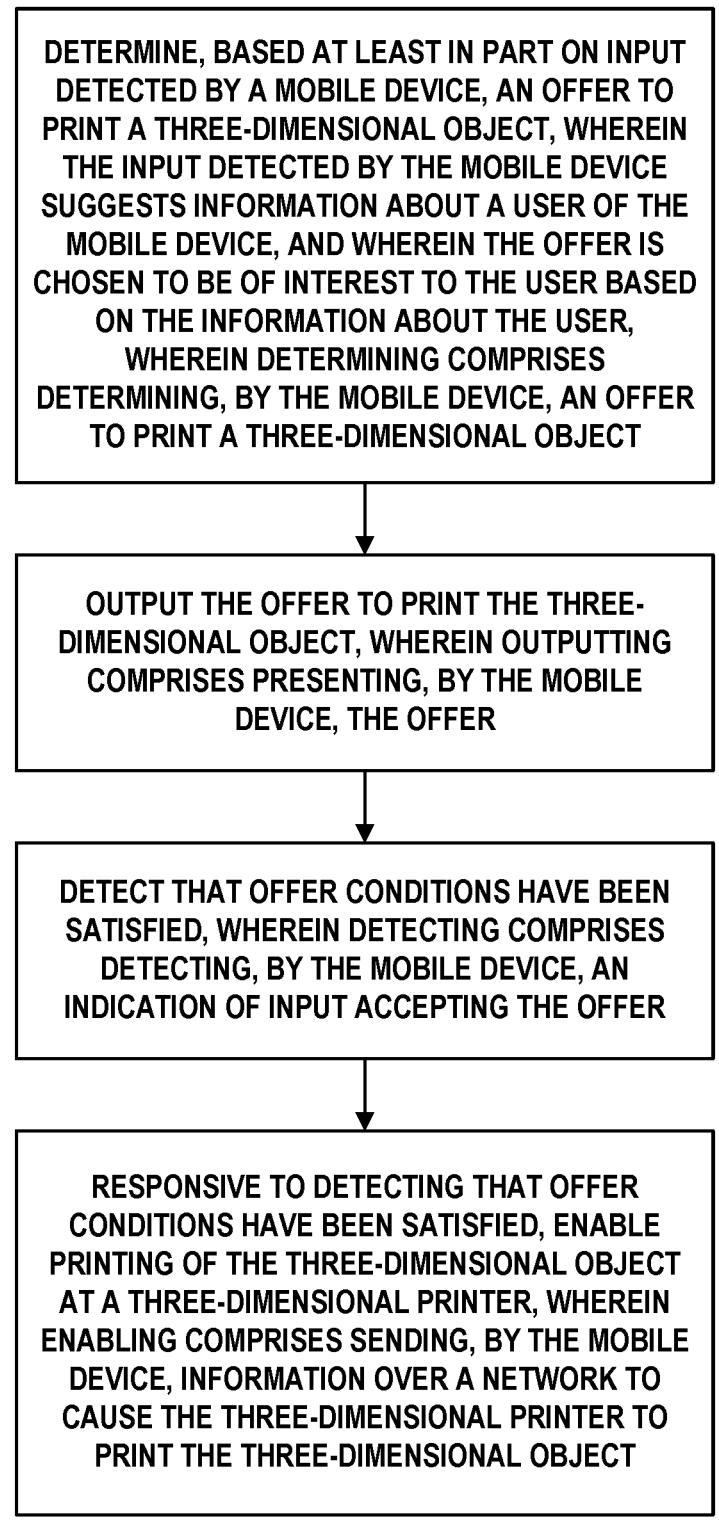
FIG. 13 is a flowchart illustrating example operations of an example mobile device in accordance with one or more aspects of the present disclosure.

FIG. 13 is a flowchart illustrating example operations of an example mobile device 200 in accordance with one or more aspects of the present disclosure. The operations of FIG. 13 may be performed by one or more processors of a computing device, such as mobile device 200 of FIG. 2. For purposes of illustration, FIG. 13 is described within the context of mobile device 200 of FIG. 1, FIG. 2, and FIG. 4.

In operation, mobile device 200 may determine, based at least in part on input detected by a mobile device, an offer to print a three-dimensional object, wherein the input detected by the mobile device suggests information about a user of the mobile device, and wherein the offer is chosen to be of interest to the user based on the information about the user, wherein determining comprises determining, by the mobile device, an offer to print a three-dimensional object. For example, mobile device 200 may determine an offer to print an action figure, based on input detected by mobile device 200 corresponding to audio from the movie "New Age Wars."

Mobile device 200 may output the offer to print the three-dimensional object, wherein outputting comprises presenting, by the mobile device, the offer. For example, mobile device 200 may present purchase notification 404 to be displayed at presence-sensitive panel 201.

Mobile device 200 may detect that offer conditions have been satisfied, wherein detecting comprises detecting, by the mobile device, an indication of input accepting the offer. For example, mobile device 200 may detect input that it determines corresponds to selection of accept button 406. Mobile device 200 may also detect information consistent with payment.

Mobile device 200 may, responsive to detecting that offer conditions have been satisfied, enable printing of the three-dimensional object at a three-dimensional printer, wherein enabling comprises sending, by the mobile device, information over a network to cause the three-dimensional printer to print the three-dimensional object. For example, mobile device 200 may send a command to three-dimensional printer 300 to print the three-dimensional object. Alternatively, mobile device 200 may communicate with offer server 150, thereby causing three-dimensional printer 300 to print the three-dimensional object.

Figure 14:
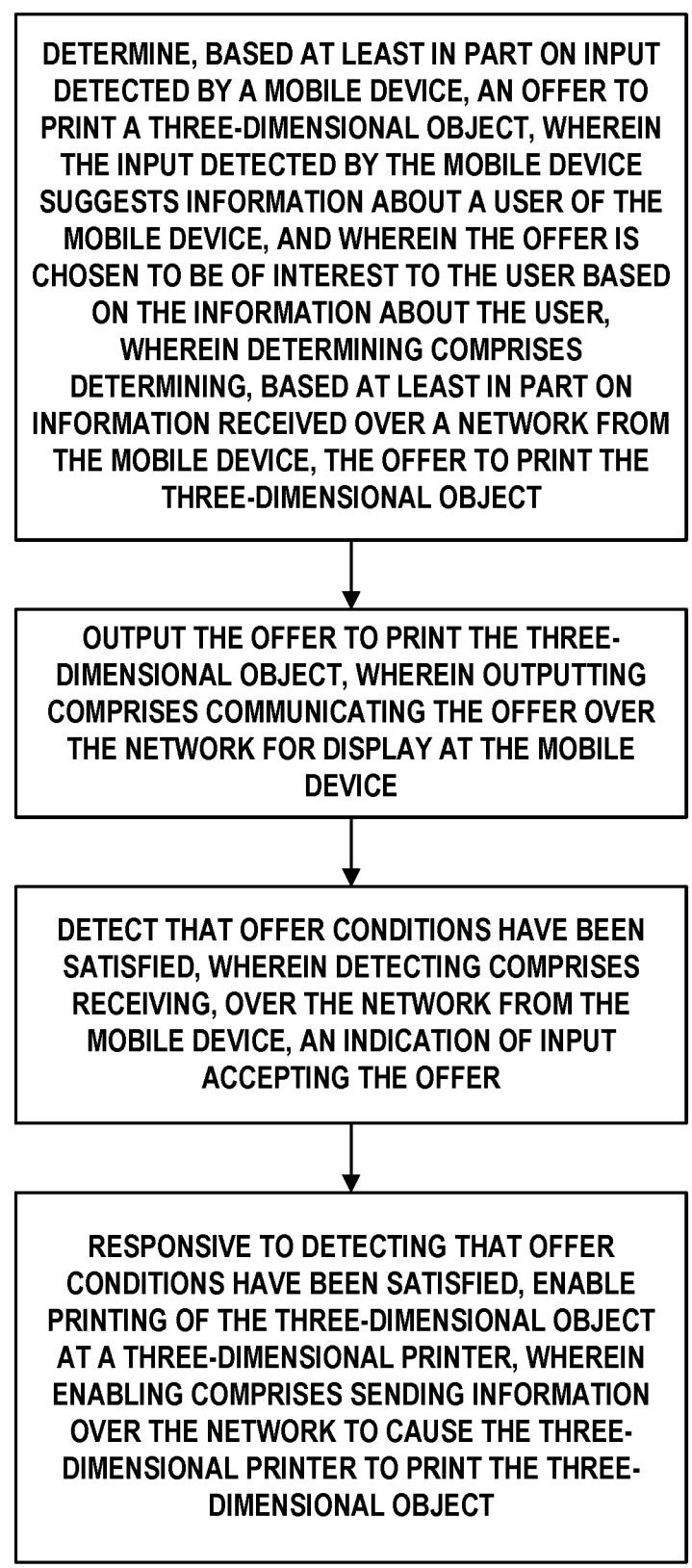
FIG. 14 is a flowchart illustrating example operations of an example offer server in accordance with one or more aspects of the present disclosure.

FIG. 14 is a flowchart illustrating example operations of an example offer server 150 in accordance with one or more aspects of the present disclosure. The operations of FIG. 14 may be performed by one or more processors of a computing device, such as mobile device 200 of FIG. 2. For purposes of illustration, FIG. 14 is described within the context of mobile device 200 of FIG. 1, FIG. 2 and FIG. 4.

In operation, offer server 150 may determine, based at least in part on an input detected by a mobile device, an offer to print a three-dimensional object, wherein the input detected by the mobile device suggests information about a user of the mobile device, and wherein the offer is chosen to be of interest to the user based on the information about the user, wherein determining comprises determining, based at least in part on information received over a network from the mobile device, the offer to print the three-dimensional object. For example, offer server 150 may determine an offer to print an action figure, based on an indication of input received from mobile device 200 corresponding to audio from the movie "New Age Wars."

Offer server 150 may output the offer to print the three-dimensional object, wherein outputting comprises communicating the offer over the network for display at the mobile device. For example, offer server 150 may send to mobile device 200 information sufficient for mobile device 200 to present purchase notification 404 at presence-sensitive panel 201.

Offer server 150 may detect that offer conditions have been satisfied, wherein detecting comprises receiving, over the network from the mobile device, an indication of input accepting the offer. For example, offer server 150 receive, over network 180, an indication of input from mobile device 200 that offer server 150 determines corresponds to selection of accept button 406.

Offer server 150 may, responsive to detecting that offer conditions have been satisfied, enable printing of the three-dimensional object at a three-dimensional printer, wherein enabling comprises sending information over the network to cause the three-dimensional printer to print the three-dimensional object. For example, offer server 150 may send a command to three-dimensional printer 300 to print the three-dimensional object. Alternatively, offer server 150 may send one or more blueprints 346 to three-dimensional printer 300 and cause three-dimensional printer 300 to print the three-dimensional object.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   collecting, by a computing system, information about a user;
   generating, by the computing system and based on the information about the user, an offer to print a three-dimensional object, wherein the offer includes a plurality of offer conditions and is generated without receiving from the user a specific request for the offer;
   outputting, by the computing system and for display, information sufficient to present the offer to the user through a user interface that identifies the plurality of offer conditions and a timeframe over which the offer conditions are to be completed;
   determining, by the computing system, that the plurality of offer conditions have been completed during the timeframe; and
   responsive to determining, enabling a three-dimensional printer to generate the three-dimensional object.

2. The method of claim 1, wherein the computing system includes a mobile device, the method further comprising:
   detecting, by the mobile device, a first indication of input;
   responsive to detecting the first indication of input, presenting, by the mobile device and based on the first indication of input, a plurality of settings relating to filtering offers;
   detecting, by the mobile device, a second indication of input, wherein the second indication of input identifies a category of offers to exclude; and
   responsive to receiving the second indication of input, refraining from outputting offers within the category of offers to exclude.

3. The method of claim 1, wherein enabling the three-dimensional printer to generate the three-dimensional object includes:
   controlling, by the computing system, operation of the three-dimensional printer by communicating over a network with the three-dimensional printer.

4. The method of claim 3, wherein the computing system includes a mobile device, and wherein controlling operation of the three-dimensional printer includes controlling operation of the three-dimensional printer in response to input detected by the mobile device.

5. The method of claim 4, wherein the method further comprises:
   after controlling the operation of the three-dimensional printer, disabling for the mobile device further printing of the three-dimensional object at the three-dimensional printer.

6. The method of claim 1, wherein the information about the user includes at least one of:
   audio information, location information, or image information.

7. The method of claim 1, further comprising:
   detecting, by the computing system, an indication of input accepting the offer.

8. The method of claim 1, wherein outputting the information sufficient to present the offer includes:
   outputting information sufficient to present the offer as a challenge comprising offer conditions that include a milestone task and a completion task, wherein the milestone task is to be performed prior to the completion task.

9. The method of claim 8, wherein the offer includes a plurality of milestone tasks, including the milestone task.

10. The method of claim 9, wherein the plurality of milestone tasks includes tasks to be completed over a series of consecutive days.

11. The method of claim 8, wherein the milestone task includes purchasing an item.

12. A system comprising:
    a storage system; and
    processing circuitry having access to the storage system and configured to:
    collect information about a user,
    generate, based on the information about the user, an offer to print a three-dimensional object, wherein the offer includes a milestone task to be performed prior to a completion task,
    output, for display, information sufficient to present the offer to the user through a user interface that identifies the milestone task, the completion task, and a timeframe over which the challenge is to be completed,
    determine that the milestone task and the completion task have been completed during the timeframe, and
    responsive to determining, enabling a three-dimensional printer to generate the three-dimensional object.

13. The system of claim 12, wherein the processing circuitry is further configured to:

detect a first indication of input;
responsive to detecting the first indication of input, present, based on the first indication of input, a plurality of settings relating to filtering offers;
detect a second indication of input, wherein the second indication of input identifies a category of offers to exclude; and
responsive to receiving the second indication of input, refrain from outputting offers within the category of offers to exclude.

14. The system of claim 12, wherein to output the information sufficient to present the offer, the processing circuitry is further configured to:
output information sufficient to present the offer as a challenge comprising the milestone task and the completion task.

15. The system of claim 12, wherein to enable the three-dimensional printer to generate the three-dimensional object, the processing circuitry is further configured to:
control operation of the three-dimensional printer by communicating over a network with the three-dimensional printer.

16. The system of claim 15, wherein the processing circuitry is further configured to:
after controlling the operation of the three-dimensional printer by communicating over a network with the three-dimensional printer, disable further printing of the three-dimensional object at the three-dimensional printer by the user.

17. The system of claim 12, wherein the offer includes a plurality of milestone tasks, including the milestone task.

18. The system of claim 17, wherein the plurality of milestone tasks includes tasks to be performed over a series of consecutive days.

19. A non-transitory computer-readable storage medium comprising instructions that, when executed, configure processing circuitry of a computing system to:
collect information about a user;
generate, based on the information about the user, an offer to print a three-dimensional object, wherein the offer includes a milestone task to be performed prior to a completion task,
output, for display, information sufficient to present the offer to the user through a user interface that identifies the milestone task, the completion task, and a timeframe over which the challenge is to be completed; and
determine that the milestone task and the completion task have been completed during the timeframe; and
responsive to determining, enabling a three-dimensional printer to generate the three-dimensional object.

20. The non-transitory computer-readable storage medium of claim 19, further comprising instructions that, when executed, configure the processing circuitry to:
detect a first indication of input;
responsive to detecting the first indication of input, present, based on the first indication of input, a plurality of settings relating to filtering offers;
detect a second indication of input, wherein the second indication of input identifies a category of offers to exclude; and
responsive to receiving the second indication of input, refrain from outputting offers within the category of offers to exclude.

* * * * *